United States Patent
Nakakura et al.

(10) Patent No.: US 11,305,243 B2
(45) Date of Patent: Apr. 19, 2022

(54) CHEMICAL REACTION DEVICE AND PARTICLE PRODUCTION METHOD USING CHEMICAL REACTION DEVICE

(71) Applicant: SUMITOMO METAL MINING CO., LTD., Tokyo (JP)

(72) Inventors: Shuhei Nakakura, Ichikawa (JP); Kazuhiko Tsuchioka, Niihama (JP); Koichiro Maki, Tokyo (JP); Motoaki Saruwatari, Niihama (JP); Kazuomi Ryoshi, Niihama (JP); Masafumi Yoshida, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 544 days.

(21) Appl. No.: 16/308,062

(22) PCT Filed: Jun. 12, 2017

(86) PCT No.: PCT/JP2017/021651
§ 371 (c)(1),
(2) Date: Dec. 7, 2018

(87) PCT Pub. No.: WO2017/217371
PCT Pub. Date: Dec. 21, 2017

(65) Prior Publication Data
US 2019/0217260 A1    Jul. 18, 2019

(30) Foreign Application Priority Data
Jun. 14, 2016   (JP) .............................. JP2016-118373

(51) Int. Cl.
*B01F 7/00*     (2006.01)
*B01F 15/00*    (2006.01)
(Continued)

(52) U.S. Cl.
CPC .......... *B01F 7/00341* (2013.01); *B01D 9/005* (2013.01); *B01D 9/0059* (2013.01);
(Continued)

(58) Field of Classification Search
CPC ......... C01G 51/04; C01G 53/00; C01G 53/04
See application file for complete search history.

(56) References Cited

U.S. PATENT DOCUMENTS

| 2003/0091501 | A1  | 5/2003  | Kato et al. |
| 2008/0282606 | A1  | 11/2008 | Plaza et al. |
| 2016/0167979 | A1* | 6/2016  | Fang ...................... C01G 51/42 423/594.19 |

FOREIGN PATENT DOCUMENTS

| CN | 103482710   | 1/2014 |
| CN | 204503060 U | 7/2015 |

(Continued)

OTHER PUBLICATIONS

Anonymous: "Chapter 9: Combustion Modeling", Apr. 7, 2016 (Apr. 7, 2016), XP055587243, Retrieved from the Internet: URL:https://www.sharcnet.ca/Software/Ansys/16.2.3/en-us/help/cfx_mod/i1365541.html [retrieved on May 9, 2019].

(Continued)

*Primary Examiner* — Elizabeth Insler
(74) *Attorney, Agent, or Firm* — IPUSA, PLLC

(57) ABSTRACT

A chemical reaction device that supplies a raw material liquid into a solution and causes particles to precipitate in the solution is provided. The chemical reaction device includes an agitation tank configured to accommodate the solution, an impeller configured to agitate the solution, and a plurality of discharge parts configured to discharge the raw material liquid into the solution.

6 Claims, 8 Drawing Sheets

(51) Int. Cl.
    *C01G 53/04* (2006.01)
    *C01G 53/00* (2006.01)
    *B01D 9/00* (2006.01)
    *B01F 7/16* (2006.01)
    *B01F 15/02* (2006.01)
    *B01J 19/00* (2006.01)
    *B01F 7/22* (2006.01)
    *H01M 4/525* (2010.01)
    *H01M 4/505* (2010.01)

(52) U.S. Cl.
    CPC .......... *B01F 7/00383* (2013.01); *B01F 7/162* (2013.01); *B01F 7/1675* (2013.01); *B01F 7/22* (2013.01); *B01F 15/00889* (2013.01); *B01F 15/0203* (2013.01); *B01J 19/006* (2013.01); *B01J 19/0066* (2013.01); *C01G 53/00* (2013.01); *C01G 53/006* (2013.01); *C01G 53/04* (2013.01); *C01G 53/42* (2013.01); *B01D 9/0036* (2013.01); *B01D 2009/0086* (2013.01); *B01J 2219/00768* (2013.01); *C01P 2002/52* (2013.01); *C01P 2004/03* (2013.01); *C01P 2004/32* (2013.01); *H01M 4/505* (2013.01); *H01M 4/525* (2013.01)

(56) References Cited

FOREIGN PATENT DOCUMENTS

| JP | 2003-146653 | 5/2003 |
| JP | 2008-086840 | 4/2008 |
| JP | 2011-201764 | 10/2011 |
| WO | 2004/032260 | 4/2004 |

OTHER PUBLICATIONS

International Search Report dated Jul. 18, 2017 with respect to PCT/JP2017/021651.

\* cited by examiner

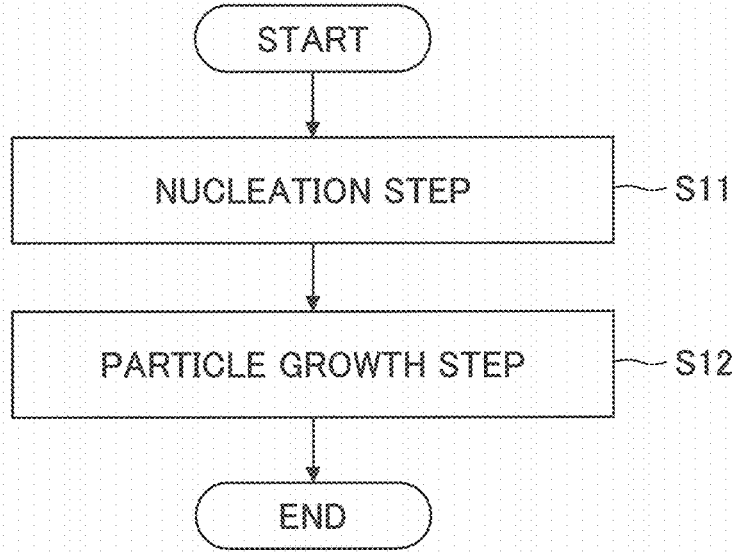
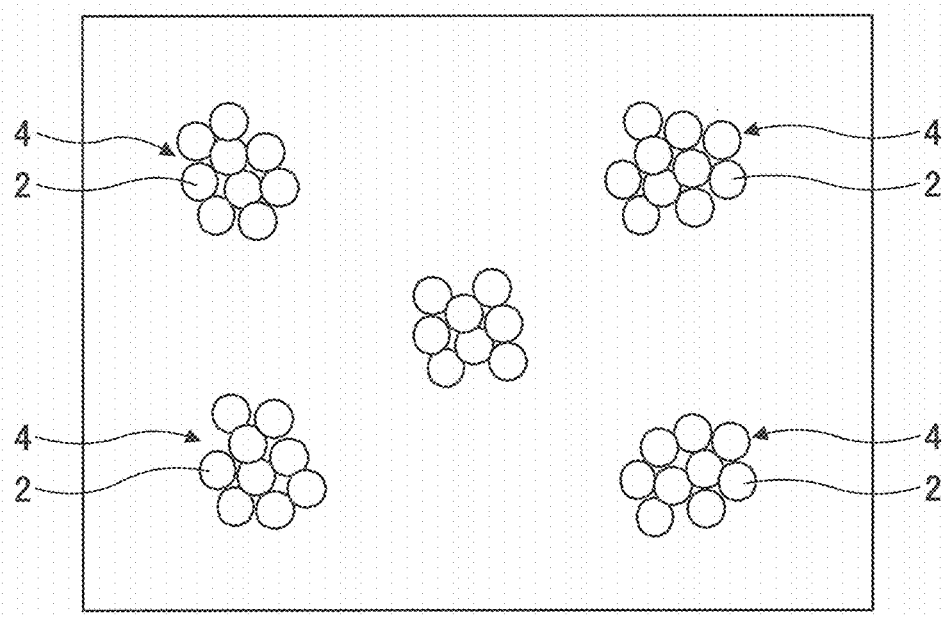

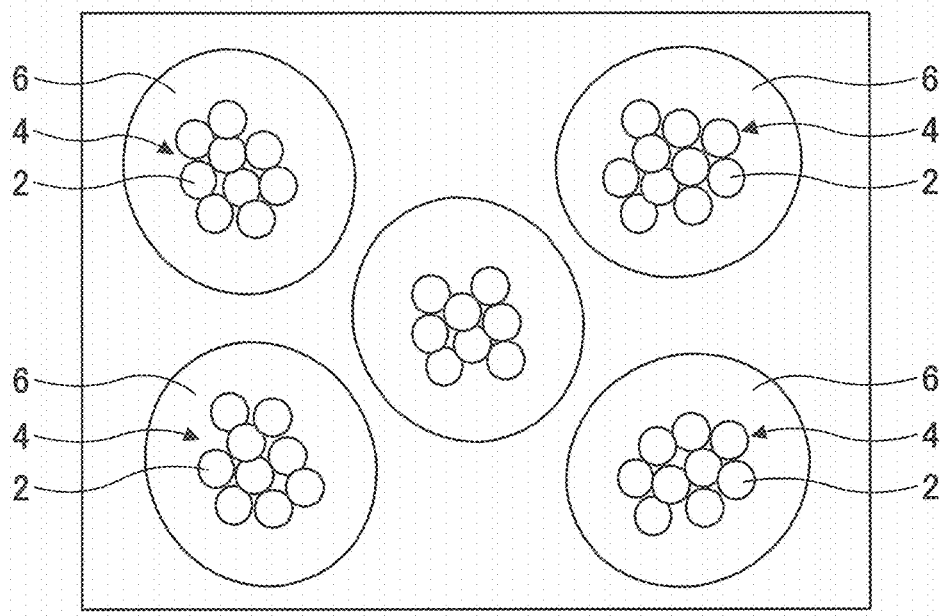
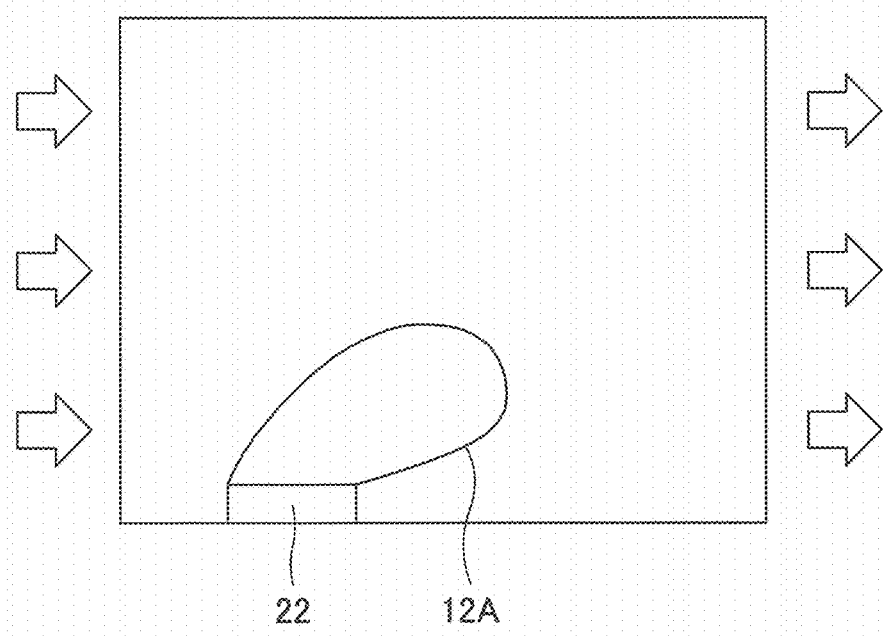

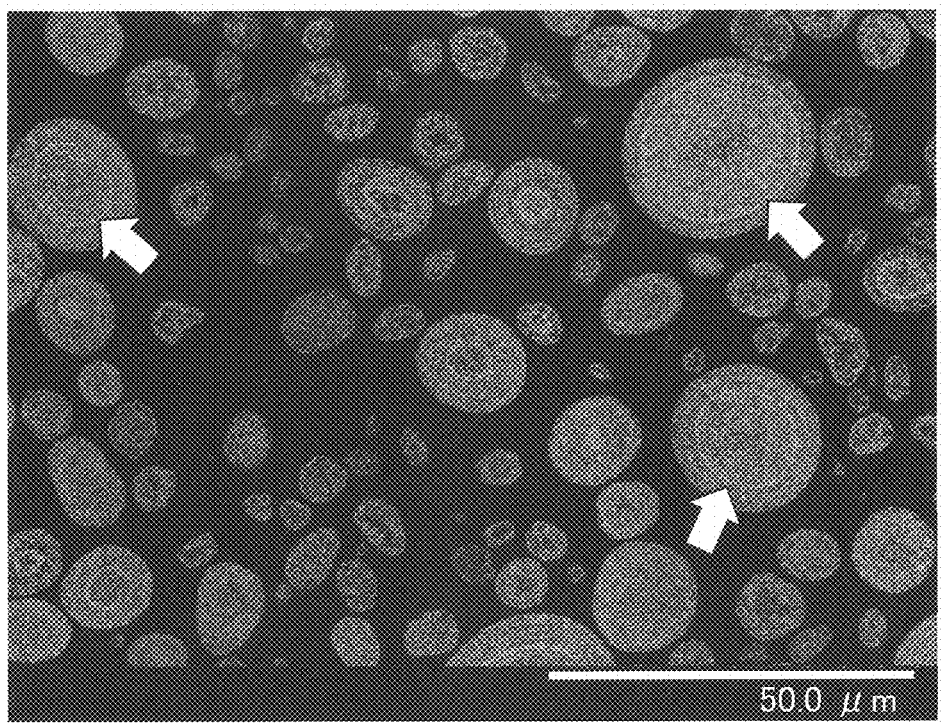

CHEMICAL REACTION DEVICE AND PARTICLE PRODUCTION METHOD USING CHEMICAL REACTION DEVICE

TECHNICAL FIELD

The present invention relates to a chemical reaction device and a particle production method using a chemical reaction device.

BACKGROUND ART

In recent years, with the widespread use of portable electronic devices, such as mobile phones and notebook computers, there is a high demand for the development of small and light nonaqueous electrolyte secondary batteries having high energy density. There is also a high demand for the development of high-output secondary batteries as batteries for electric vehicles such as hybrid electric vehicles. Lithium ion batteries are nonaqueous secondary batteries that can satisfy these demands. A lithium ion secondary battery includes a negative electrode, a positive electrode, an electrolyte solution, and the like. Materials capable of sustaining lithium insertion and deinsertion are used as a negative-electrode active material and a positive electrode active material.

Lithium composite oxides, particularly, lithium-cobalt composite oxides, which are relatively easy to synthesize, are promising materials for use as the positive electrode material because lithium ion secondary batteries that use lithium composite oxides as the positive electrode material can achieve a high voltage of around 4V. As such, practical applications of lithium ion secondary batteries using lithium composite oxides are being developed as batteries having high energy density. Note that numerous efforts have been made to develop lithium ion secondary batteries using lithium-cobalt composite oxides with improved initial capacity characteristics and cycle characteristics, and various positive outcomes have been obtained therefrom.

However, because an expensive cobalt compound is used as a raw material in a lithium-cobalt composite oxide, the cost per capacity of batteries using lithium-cobalt composite oxides is substantially higher than nickel-hydrogen batteries, and as such, their applications are substantially limited. Thus, cost reduction of the positive electrode active material is desired with respect to both small secondary batteries used in portable devices and large secondary batteries for electric power storage and electric vehicles, and the development of techniques for reducing the cost of the positive electrode active material to enable production of a more inexpensive lithium ion secondary battery will have great potential and industrial significance.

An example of a potential new material to be used as the active material of a lithium ion secondary battery includes a lithium-nickel composite oxide that uses nickel, which is a cheaper alternative to cobalt. The lithium-nickel composite oxide exhibits a lower electrochemical potential as compared with the lithium-cobalt composite oxide, and as such, the lithium-nickel composite oxide may be less prone to problems of decomposition due to oxidation of the electrolyte, achieve higher capacity, and exhibit a high battery voltage comparable to that of the cobalt-based lithium ion secondary battery. As such, active research and development efforts are being made with respect to the lithium-nickel composite oxide. However, when a purely nickel-based lithium composite oxide synthesized with only nickel is used as the positive electrode active material of a lithium ion secondary battery, cycle characteristics may be degraded as compared with cobalt-based lithium ion secondary batteries. Also, such a purely-nickel-based lithium ion secondary battery may be prone to battery performance degradation when stored or used in a high temperature environment. In this respect, lithium-nickel composite oxides obtained by substituting a part of nickel with cobalt or aluminum are generally known.

A general method for producing the positive electrode active material involves (1) first, preparing a nickel composite hydroxide as a precursor of the lithium-nickel composite oxide using the so-called neutralization crystallization method, and (2) mixing the precursor with a lithium compound and firing the mixture. Of the above process steps, a representative example of process step (1) for producing particles by the neutralization crystallization method includes a process using an agitation tank.

Patent Document 1 describes a method that involves supplying a mixed aqueous solution containing a nickel salt and a cobalt salt, an aqueous solution containing an ammonium ion supplier, and a caustic alkali aqueous solution into an agitation tank and causing a reaction so that nickel-cobalt composite hydroxide particles are precipitated. Patent Document 1 describes how particles having a large particle diameter, high crystallinity, and a substantially spherical shape can be obtained by setting up the ratio of the supply amount of the mixed aqueous solution with respect to the supply amount of a reaction aqueous solution per supply port to be less than or equal to 0.04 vol %/min.

PRIOR ART DOCUMENTS

Patent Documents

Patent Document 1: Japanese Unexamined Patent Publication No. 2011-201764

SUMMARY OF THE INVENTION

Problem to be Solved by the Invention

Various studies have been conducted to produce nickel-containing hydroxide particles having desired characteristics.

However, production conditions have to be set up each time the type or diameter of an impeller of an agitation tank, the volume of the agitation tank, or some other device structure is changed.

The inventors of the present invention investigated conditions for universally improving the quality of particles in various chemical reaction devices having various structures and directed their focus on the volume fraction of a highly supersaturated region in a solution accommodated in the agitation tank.

Note that a highly supersaturated region refers to a region in a solution where the concentration of a particle component dissolved in the solution is greater than or equal to a predetermined value. In the highly supersaturated region, the concentration of the particle component in the solution is substantially higher than the solubility of the particle component, and as such, precipitation of the particle component occurs at a significant rate.

The inventors of the present invention have found that the smaller the volume fraction of the highly supersaturated region in the solution accommodated in the agitation tank, the more gradual the precipitation of the particle component, which could lead to improvement in the quality of particles.

Note that the highly supersaturated region is formed in the vicinity of a discharge port for discharging a raw material liquid into the solution. Prompt diffusion of the particle components is desired in order to reduce the volume of the highly supersaturated region, and increasing the rotation speed of the impeller is an effective measure for achieving such an end.

However, when the rotation speed of the impeller is increased, energy consumption is also increased.

The present invention has been made in view of the above problems of the related art, and it is an object of the present invention to provide a chemical reaction device that is capable of efficiently improving the quality of particles.

Means for Solving the Problem

According to one embodiment of the present invention, a chemical reaction device that supplies a raw material liquid into a solution and causes particles to precipitate in the solution is provided. The chemical reaction device includes an agitation tank configured to accommodate the solution, an impeller configured to agitate the solution, and a plurality of discharge parts configured to discharge the raw material liquid into the solution.

Advantageous Effect of the Invention

According to an aspect of the present invention, a chemical reaction device that is capable of efficiently improving the quality of particles may be provided.

BRIEF DESCRIPTION OF THE DRAWINGS

FIG. 4 is a flowchart showing a method for producing a nickel-containing hydroxide according to an embodiment of the present invention;

FIG. 5 is a schematic cross-sectional view of an aggregate formed during a first half of a particle growth step according an embodiment of the present invention;

FIG. 6 is a schematic cross-sectional view of an outer shell formed during a second half of the particle growth step according to an embodiment of the present invention;

FIG. 7 is a diagram showing a first highly supersaturated region in a reaction aqueous solution during a nucleation step according to an embodiment of the present invention;

FIG. 12 is an SEM image of cross sections of particles obtained in a case where the volume fraction of the second highly supersaturated region in the reaction aqueous solution accommodated in the continuous agitation tank was 0.624% of the reaction aqueous solution.

EMBODIMENTS FOR IMPLEMENTING THE INVENTION

Figure 1:
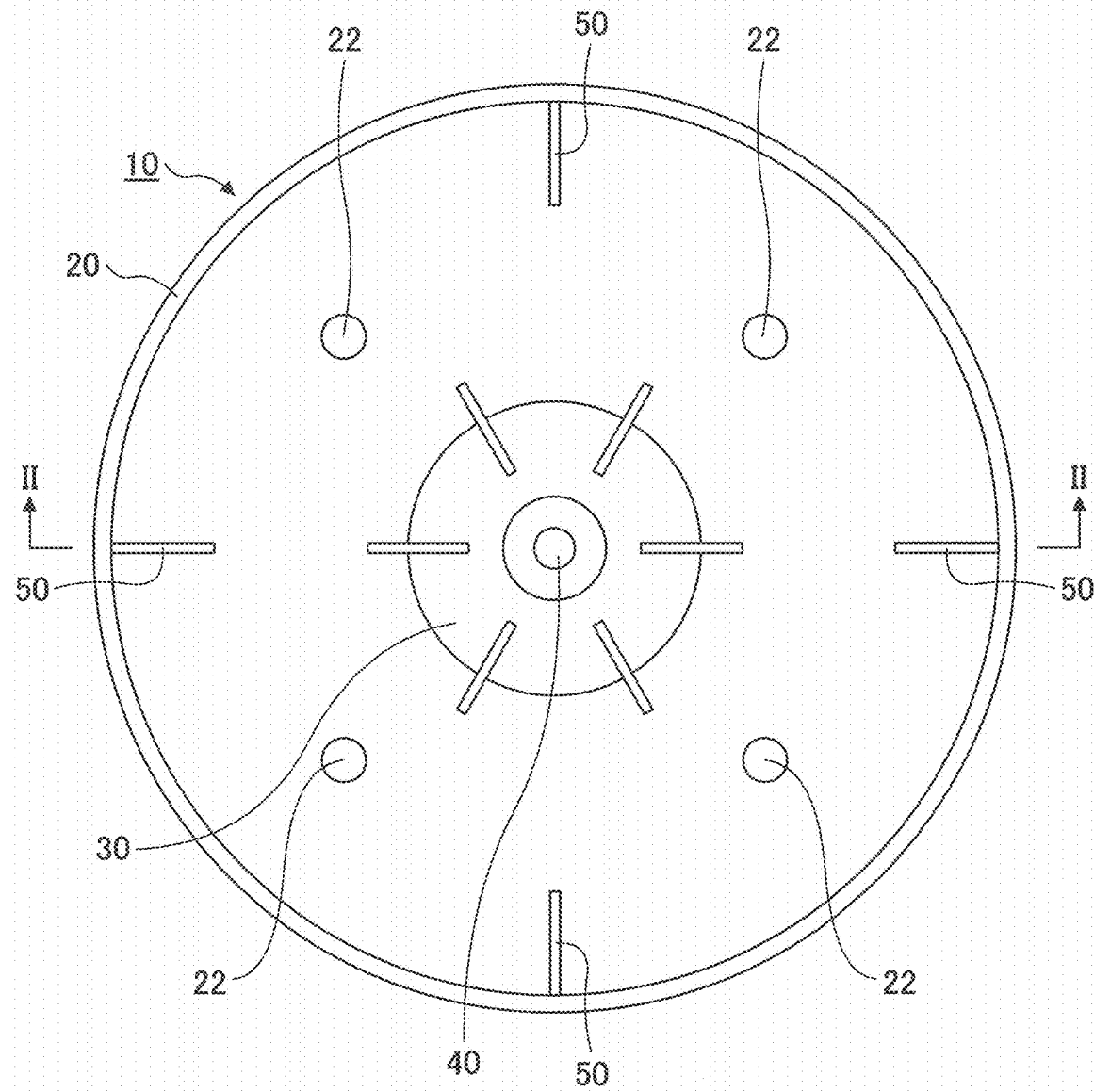
FIG. 1 is a top view of a chemical reaction device according to an embodiment of the present invention.

In the following, embodiments of the present invention will be described with reference to the accompanying drawings. Note that in the present description and the drawings, identical or corresponding elements are given the same reference numerals and overlapping descriptions thereof may be omitted.

Figure 2:
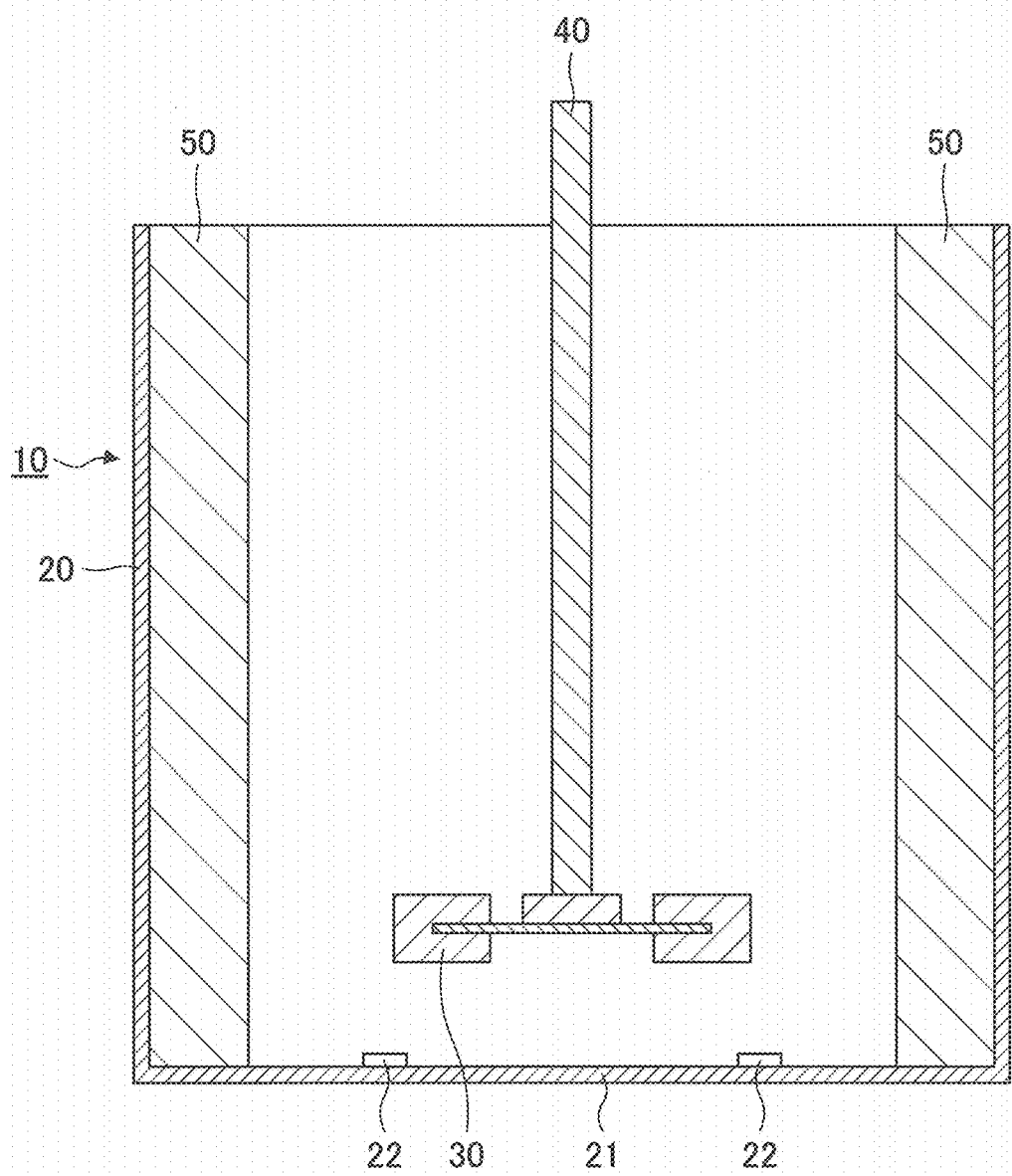
FIG. 2 is a cross-sectional view of the chemical reaction device across line II-II of FIG. 1.

FIG. 1 is a top view of a chemical reaction device according to an embodiment of the present invention. FIG. 2 is a cross-sectional view of the chemical reaction device across line II-II of FIG. 1.

The chemical reaction device 10 supplies a raw material liquid into a solution and causes particles to precipitate in the solution. For example, the solution may contain a metal salt and a base, and the raw material liquid may contain a metal salt, and the particles may precipitate by neutralization crystallization. In a case where the metal salt includes a nickel salt, the particles are nickel-containing hydroxide particles. Note, however, that the type of the particles is not limited to the nickel-containing hydroxide particles.

The chemical reaction device 10 may include, for example, an agitation tank 20, an impeller 30, a shaft 40, and a baffle 50. The agitation tank 20 accommodates a solution in a cylindrical inner space. The impeller 30 agitates the solution in the agitation tank 20. The impeller 30 is attached to the lower end of the shaft 40. The impeller 30 may be rotated by rotating the shaft 40 with a motor or the like. The center line of the agitation tank 20, the center line of the impeller 30, and the center line of the shaft 40 may coincide and may be vertical. The baffle 50 is also referred to as a baffle plate. The baffle 50 protrudes from the inner peripheral surface of the agitation tank 20, and generates an upward flow and a downward flow by interfering with a rotating flow, thereby improving agitation efficiency of the reaction aqueous solution.

The inventors of the present invention investigated conditions for universally improving the quality of particles in various chemical reaction devices having various structures and directed their focus on the volume fraction of a highly supersaturated region in the solution accommodated in the agitation tank 20.

A highly supersaturated region refers to a region in a solution where the concentration of a particle component dissolved in the solution is greater than or equal to a predetermined value. In the highly supersaturated region, the concentration of the particle component in the solution is substantially higher than the solubility of the particle component, and as such, precipitation of the particle component occurs at a significant rate.

Note that the smaller the volume fraction of the highly supersaturated region in the solution accommodated in the agitation tank 20, the more gradual the precipitation of the particle component, thereby resulting in improved quality of particles. In a case where the solution has a plurality of highly supersaturated regions, the volume of the highly supersaturated region is the total volume of all the highly supersaturated regions.

The highly supersaturated region is formed in the vicinity of a discharge port for discharging the raw material liquid into the solution. The discharge port is provided in the flow field of the solution, and as such, the volume of the highly supersaturated region is influenced by the flow field. The flow field varies depending on the rotation speed of the impeller 30 as well as the type of the impeller 30, the impeller diameter, the volume of the agitation tank 20, and the like. In the following, a condition having an influence on the flow field of the agitation tank 20 will be referred to as "agitation condition".

The flow field of the agitation tank 20 and the volume of the highly supersaturated region may be determined by simulation.

In the following, an example steady state fluid analysis in the case of producing nickel hydroxide by reacting nickel sulfate and sodium hydroxide in a continuous agitation tank will be mainly described. Note that the fluid analysis software used in the following example is ANSYS CFX Ver. 15.0 (product name) manufactured by ANSYS Co., Ltd. The analysis conditions and the like are described below.

<Coordinate System>

A region around the shaft and the impeller from among the regions to be analyzed in the fluid analysis (hereinafter also referred to as "analysis region") is covered by a rotating coordinate system that rotates along with the shaft and the impeller. The region to be covered by the rotating coordinate system is cylindrical, its center line is arranged to coincide with the center lines of the shaft and the impeller, its diameter is set to 115% of the diameter of the impeller, and its range in the vertical direction extends from the inner bottom surface to the liquid surface of the agitation tank.

Other regions of the analysis region are covered by a stationary coordinate system.

The rotating coordinate system and the stationary coordinate system are connected using an interface function of the fluid analysis software. Note that the optional setting "Frozen Rotor" is used as the interface function of the fluid analysis software.

<Turbulence Model>

The flow in the agitation tank is a turbulent flow rather than a laminar flow. Specifically, the SST (Shear Stress Transport) turbulence model is used as the turbulence model of the flow.

<Chemical Reaction>

The chemical reaction that occurs in the agitation tank may be represented by the following formula:

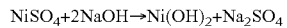

In the fluid analysis, a single-phase multi-component fluid that contains the following five components is analyzed.

1) Reactant component A: $NiSO_4$
2) Reactant component B: $NaOH$
3) Product component C: $Ni(OH)_2$
4) Product component D: $Na_2SO_4$
5) Water The rate of the chemical reaction is calculated by the eddy dissipation model. The eddy dissipation model is a reaction model that assumes that the above chemical reaction occurs when the reactant component A and the reactant component B are mixed to the molecular level by turbulence dispersion. The settings of the eddy dissipation model are left as is to the default settings of the fluid analysis software.

<Calculation of Mass Fraction of Components>

The total mass fraction of the above five components at a given time point and a given position in the analysis region is equal to one. As such, the mass fraction of each of the four components other than water from among the above five components is obtained by solving the transport equation by CFX, and the mass fraction of water is obtained by subtracting the total mass fraction of the above four components from one.

<Boundary Condition>

Wall Boundary (Boundary with No Fluid Flow)

It is assumed that no slip occurs at boundaries with solid surfaces such as the agitation tank, the shaft, the impeller, the baffle, and the like. On the other hand, it is assumed that slips occur at the boundary with the outside air (liquid surface). Note that that the liquid surface is assumed to be a flat surface with a constant height that is not deformed by agitation.

Inflow Boundary (Boundary where Fluid Enters)

An inflow boundary where an aqueous solution containing the reactant component A (hereinafter referred to as "aqueous solution A") flows into the fluid in the agitation tank and an inflow boundary where an aqueous solution containing the reactant component B (hereinafter referred to as "aqueous solution B") flows into the fluid in the agitation tank are separately provided.

It is assumed that the inflow rate of the aqueous solution A, the proportion of the reactant component A in the aqueous solution A, the inflow rate of the aqueous solution B, and the proportion of the reactant component B in the aqueous solution B are constant. The inflow rate of the aqueous solution B is set up so that the pH value of the aqueous solution in the agitation tank is maintained at a predetermined value (e.g., 12.0).

Outflow Boundary (Boundary where Fluid Flows Out)

An outflow boundary where the fluid in the agitation tank flows out is provided on a part of the inner peripheral surface of the agitation tank. The outflowing liquid contains the product components C and D, the unreacted reactant components A and B, and water. The outflow rate of the outflowing liquid is set up so that the pressure difference between the analysis region and a region outside the system becomes zero.

Note that in a case where an overflow type continuous system is used, the liquid surface corresponds to the outflow boundary.

<Thermal Condition>

The temperature of the fluid in the agitation tank is maintained constant at 25° C. It is assumed that heat generation by the chemical reaction and heat input/output at the inflow boundary and the outflow boundary do not occur.

<Initial Condition>

The fluid in the agitation tank, in its initial state, is assumed to be homogeneous and contains only two components out of the above five components, i.e., the reactant component B and water. Specifically, the initial mass fraction of the reactant component A, the initial mass fraction of the product component C, the initial mass fraction of the product component D in the fluid in the agitation tank at the initial stage are zero, and the initial mass fraction of the reactant component B is set up so that the pH value of the aqueous solution in the agitation tank will be at the above predetermined value.

Note that although the initial mass fraction of the product component C and the initial mass fraction of the product component D are set to zero in the present example, in order to reduce the number of iterative calculations (i.e., calculation time) for obtaining a steady state solution, the initial mass fraction may alternatively be set to the average value for the entire analysis region that is estimated to be reached in a steady state, for example. The average value for the entire analysis region may be calculated based on the inflow rate of the aqueous solution A, the proportion of the reactant component A in the aqueous solution A, the inflow rate of the aqueous solution B, the proportion of the reactant component B in the aqueous solution B, the quantitative relationship expressed by the chemical reaction formula, and the like.

<Convergence Determination>

The iterative calculations for obtaining a steady state solution are performed until the root mean square errors of the flow velocity component (m/s) of the flow, the pressure (Pa), and the mass fractions of the above four components at a given position in the analysis region become less than or equal to $10^{-4}$.

<Calculation of Volume of Highly Supersaturated Region>

The highly supersaturated region is a region where the concentration of the product component C dissolved in the aqueous solution in the agitation tank is greater than or equal to a predeteLmined value. As described in detail below, the predetermined value during a nucleation step is set to 5.0 mol/m$^3$, and the predetermined value during a particle growth step is set to 1.7 mol/m$^3$. In the following, the highly supersaturated region set up in the nucleation step will also be referred to as "first highly supersaturated region", and the highly supersaturated region set up in the particle growth step will also be referred to as "second highly supersaturated region". The minimum value for the concentration of the product component C in the first highly supersaturated region is set higher than the minimum value for the concentration in the second highly supersaturated region because the minimum concentration for causing nucleation to occur is higher than the minimum concentration for causing particle growth to occur. The highly supersaturated region is formed around the inflow boundary of the aqueous solution A.

Note that in the fluid analysis, as described above, the above five components are treated as a single-phase multi-component fluid, and as such, all of the product component C contained therein is treated as a liquid. However, in reality, most of the product component C is precipitated into a solid, and only the remaining part of the product component C is dissolved in the aqueous solution as a liquid.

Accordingly, the volume of the highly supersaturated region is calculated by correcting the concentration distribution of the product component C obtained by the fluid analysis. The correction involves uniformly decreasing the concentration of the product component C across the entire fluid in the agitation tank by a predetermined value so that the concentration of the product component C at the outflow boundary that is sufficiently far from the inflow boundary of the aqueous solution A will be equivalent to the solubility of the product component C.

Note that in the case where a batch agitation tank is used as opposed to a continuous agitation tank, no outflow boundary is present. In this case, correction of the concentration distribution may involve uniformly decreasing the concentration of the product component C across the entire fluid in the agitation tank by a predetermined value so that the concentration of the product component C at the liquid surface of the aqueous solution in the agitation tank will be equivalent to the solubility of the product component C. Also, in the case where an overflow type continuous agitation tank is used, the liquid surface corresponds to the outflow boundary.

Note that although analysis conditions for obtaining a nickel hydroxide are described above, analysis conditions for obtaining a nickel composite hydroxide can be similarly set up. For example, in the case of obtaining a nickel-manganese composite hydroxide by reacting nickel sulfate and manganese sulfate with sodium hydroxide, the fluid analysis involves analyzing a single-phase multi-component fluid that contains the following seven components.

1) Reactant component A1: $NiSO_4$
2) Reactant component A2: $MnSO_4$
3) Reactant component B: NaOH
4) Product component C1: $Ni(OH)_2$
5) Product component C2: $Mn(OH)_2$
6) Product component D: $Na_2SO_4$
7) Water In the above example, it is assumed that two chemical reactions, i.e., "A1+2B→C1+D" and "A2+2B→C2+D" occur in the agitation tank, and an eddy dissipation model corresponding to each chemical reaction is used as a reaction model. The reactant component A1 and the reactant component A2 are uniformly dissolved in water and supplied from the same inflow boundary. That is, an aqueous solution A containing both the reactant component A1 and the reactant component A2 is supplied from the inflow boundary. A highly supersaturated region is formed around the inflow boundary of the aqueous solution A. The highly supersaturated region refers to a region where the total molar concentration of all the metal hydroxides (product component C1 and product component C2 in the present example) from among the product components dissolved in the aqueous solution in the agitation tank is greater than or equal to a predetermined value as described above.

The reason for totaling the molar concentrations of all the metal hydroxides from among the product components will be described below. First, as described above, the reactant component A1 and the reactant component A2 that are uniformly dissolved in water flow into the agitation tank from the same inflow boundary. At this time, the reactant component A1 and the reactant component A2 promptly react with the reactant component B to produce the product component C1 and the product component C2. Thus, the product component C1 and the product component C2 are sufficiently mixed together at the time they are generated. As a result, the product component C1 and the product component C2 do not precipitate as individual hydroxides, but instead, a hydroxide of a composite of the product component C1 and the product component C2 precipitates as a solid solution.

Also, for example, in the case of obtaining a nickel composite hydroxide that contains nickel, cobalt, and aluminum using nickel sulfate, cobalt sulfate, and aluminum sulfate, the fluid analysis involves analyzing a single-phase multi-component fluid that contains the following nine components.

1) Reactant component A1: $NiSO_4$
2) Reactant component A2: $CoSO_4$
3) Reactant component A3: $Al_2(SO_4)_3$ 4) Reactant component B: NaOH
5) Product component C1: $Ni(OH)_2$
6) Product component C2: $Co(OH)_2$
7) Product component C3: $Al(OH)_3$
8) Product component D: $Na_2SO_4$
9) Water In the above example, it is assumed that three chemical reactions, i.e., "A1+2B→C1+D", "A2+2B→C2+D", and "½A3+3B→C3+3/2D" occur in the agitation tank, and an eddy dissipation model corresponding to each chemical reaction is used as a reaction model. The reactant component A1, the reactant component A2, and the reactant component A3 are uniformly dissolved in water and supplied from the same inflow boundary. That is, an aqueous solution A containing the reactant component A1, the reactant component A2, and the reactant component A3 is supplied from the inflow boundary. A highly supersaturated region is formed around the inflow boundary of the aqueous solution A. The highly supersaturated region refers to a region where the total molar concentration of all the metal hydroxides (product component C1, product component C2, and product component C3 in the present example) from among the product components dissolved in the aqueous solution in the agitation tank is greater than or equal to a predetermined value as described above.

The reason for totaling the molar concentrations of all the metal hydroxides from among the product components will be described below. First, as described above, the reactant component A1, the reactant component A2, and the reactant component A3 that are uniformly dissolved in water flow into the agitation tank from the same inflow boundary. At this time, the reactant component A1, the reactant component A2, and the reactant component A3 promptly react with the reactant component B to produce the product component C1, the product component C2, and the product component C3. Thus, the product component C1, the product component C2, and the product component C3 are sufficiently mixed together at the time they are generated. As a result, the product component C1, the product component C2, and the product component C3 do not precipitate as individual hydroxides, but instead, a hydroxide of a composite of the product component C1, the product component C2, and the product component C3 precipitates as a solid solution.

Further, for example, in the case of obtaining a nickel-cobalt-manganese composite hydroxide using nickel sulfate, manganese sulfate, and cobalt sulfate, the fluid analysis involves analyzing a single-phase multicomponent fluid that contains the following nine components.
1) Reactant component A1: $NiSO_4$
2) Reactant component A2: $MnSO_4$
3) Reactant component A3: $CoSO_4$
4) Reactant component B: NaOH
5) Product component C1: $Ni(OH)_2$
6) Product component C2: $Mn(OH)_2$
7) Product component C3: $Co(OH)_2$
8) Product Component D: $Na_2SO_4$
9) Water In the above example, it is assumed that three chemical reactions, i.e., "A1+2B→C1+D", "A2+2B→C2+D", and "½A3+3B→C3+3/2D" occur in the agitation tank, and an eddy dissipation model corresponding to each chemical reaction is used as a reaction model. The reactant component A1, the reactant component A2, and the reactant component A3 are uniformly dissolved in water and supplied from the same inflow boundary. That is, an aqueous solution A containing the reactant component A1, the reactant component A2, and the reactant component A3 is supplied from the inflow boundary. A highly supersaturated region is formed around the inflow boundary of the aqueous solution A. The highly supersaturated region refers to a region where the total molar concentration of all the metal hydroxides (product component C1, product component C2, and product component C3 in the present example) from among the product components dissolved in the aqueous solution in the agitation tank is greater than or equal to a predetermined value as described above.

The reason for totaling the molar concentrations of all the metal hydroxides from among the product components is similar to the above-described reason for totaling the molar concentrations of all the metal hydroxides from among the product components in the case of obtaining the nickel composite hydroxide containing nickel, cobalt, and aluminum, and as such, a description thereof will be omitted.

Note that in some embodiments, a plurality of inflow boundaries for the aqueous solution A may be provided, and a plurality of highly supersaturated regions may exist. In the case where a plurality of highly supersaturated regions exists, the volume of the highly supersaturated region corresponds to the total volume of all the highly supersaturated regions.

The method for producing a nickel-containing hydroxide may include a step of confirming the volume fraction of the highly supersaturated region in the aqueous solution accommodated in the agitation tank by simulation. Such a confirmation may be made each time a production condition is changed. Changing a production condition may include, for example, changing the capacity or shape of the agitation tank; changing the number, shape, size, or installation location of the impeller; changing the rotation speed of the impeller; changing the flow rate or concentration of the raw material liquid; or changing the shape, the number, or the location of nozzles for supplying the raw material liquid. For example, in the case of using a batch agitation tank, the confirmation may only need to be made once under the same production conditions; that is, the confirmation does not have to be made every time production is performed as long as the production conditions are not changed.

Note that the actual reaction aqueous solution also contains ammonia as a chemical component. However, ammonia is not directly involved in the precipitation reaction of solid particles, and its concentration is also lower than the concentration of nickel hydroxide. As such, it may be presumed that the influence of ammonia on the volume of the highly supersaturated region of nickel hydroxide is small. Thus, ammonia, as one of chemical components to be solved in the simulation model, is treated as water.

The inventors of the present invention used simulation to investigate ways to reduce the volume of the highly supersaturated region in cases where the agitation condition is the same and the flow rate of the raw material liquid supplied into the agitation tank 20 is the same. As a result, the inventors found that the volume of the highly supersaturated region mainly depends on (1) the number (N) of raw material liquid discharge ports, and (2) the value of UK in the vicinity of the raw material liquid discharge ports (described in detail below). UK represents the product of a flow velocity U (m/s) and a turbulent diffusion coefficient K ($m^2/s$). The value of UK varies depending on the location within the agitation tank 20 even when the agitation condition is the same.

Table 1 shows the relationship between the number (N) of raw material liquid discharge ports and the volume (V1, V2) of the highly supersaturated region in the case where the agitation condition is the same and the flow rate of the raw material liquid supplied into the agitation tank 20 is the same. When the number N is a plural number, the flow rate of the raw material liquid from each discharge port is assumed to be 1/N of the flow rate from one discharge port when the number N is one. The flow rate refers to the amount of liquid supplied per unit time. Also, it is assumed that the value of UK in the vicinity of the discharge ports when the number N is a plural number is substantially the same as the value of UK in the vicinity of the discharge port when the number N is one. Also, when the number N is a plural number, the distance between the discharge ports is set up so that the highly supersaturated regions do not overlap.

In Table 1, V1 represents the volume of the first highly supersaturated region, and V2 represents the volume of the second highly supersaturated region. Also, $V1_0$ represents the value of V1 when the number N is one, and $V2_0$ represents the value of V2 when the number N is one. When the number N is a plural number, V1 represents the total volume of the plural number N of first highly supersaturated regions, and V2 represents the total volume of the plural number N of second highly supersaturated regions.

TABLE 1

|  | N | | |
|---|---|---|---|
|  | 1 | 2 | 4 |
| $V1/V1_0$ | 1.00 | 0.53 | 0.19 |
| $V2/V2_0$ | 1.00 | 0.52 | 0.24 |

As can be appreciated from Table 1, the greater the number N of raw material liquid discharge ports, the smaller the volumes V1 and V2 of the highly supersaturated regions. Such a tendency could be observed even when the agitation condition was changed. Also, such a tendency could be observed even when the flow rate of the raw material liquid supplied into the agitation tank was changed. The inventors of the present invention found that the volumes V1 and V2 of the highly supersaturated regions could be reduced by dividing the raw material liquid and supplying the raw material liquid into the agitation tank from a plurality of discharge ports.

As shown in FIG. 1, the chemical reaction device according to the present embodiment includes a plurality of discharge parts 22 for discharging the raw material liquid into the solution accommodated in the agitation tank 20. Each of the discharge parts 22 is provided with one discharge port. By dividing the raw material liquid and supplying the raw material liquid into the agitation tank 20 from a plurality of discharge parts 22, the volumes V1 and V2 of the highly supersaturated regions relative to the volume of the entire solution accommodated in the agitation tank 20 can be reduced. As the volume fraction of the highly supersaturated region becomes smaller, the precipitation of the particle component becomes more gradual. As a result, the quality of the obtained particles can be improved.

To adequately achieve such an effect, the distance between the discharge parts 22 are preferably set up so that the highly supersaturated regions do not overlap with each other. Arranging the discharge parts 22 so close to each other to the extent that the highly supersaturated regions overlap with each other defeats the purpose of providing a plurality of discharge parts 22 as opposed to a single discharge part. Whether the highly supersaturated regions will overlap with each other can be determined by the above-described simulation.

For example, to prevent the first highly supersaturated regions from overlapping with each other in the nucleation step, the distance between the centers of the discharge parts 22 may have to be greater than or equal to 75 mm. Further, to prevent the second highly supersaturated regions from overlapping with each other in the particle growth step, the distance between the centers of the discharge parts 22 may have to be greater than or equal to 120 mm, for example.

Note that the distance between the discharge parts 22 may be set up so that only one or both of the following two conditions are satisfied: (A) the first highly supersaturated regions do not overlap with each other in the nucleation step, and (B) the second highly supersaturated regions do not overlap with each other in the particle growth step.

The distance between the discharge parts 22 may be the same in the nucleation step and the particle growth step. However, if the nucleation step and the particle growth step are performed separately, the distance between the discharge parts 22 may be changed depending on whether the nucleation step or the particle growth step is being performed.

Figure 3:
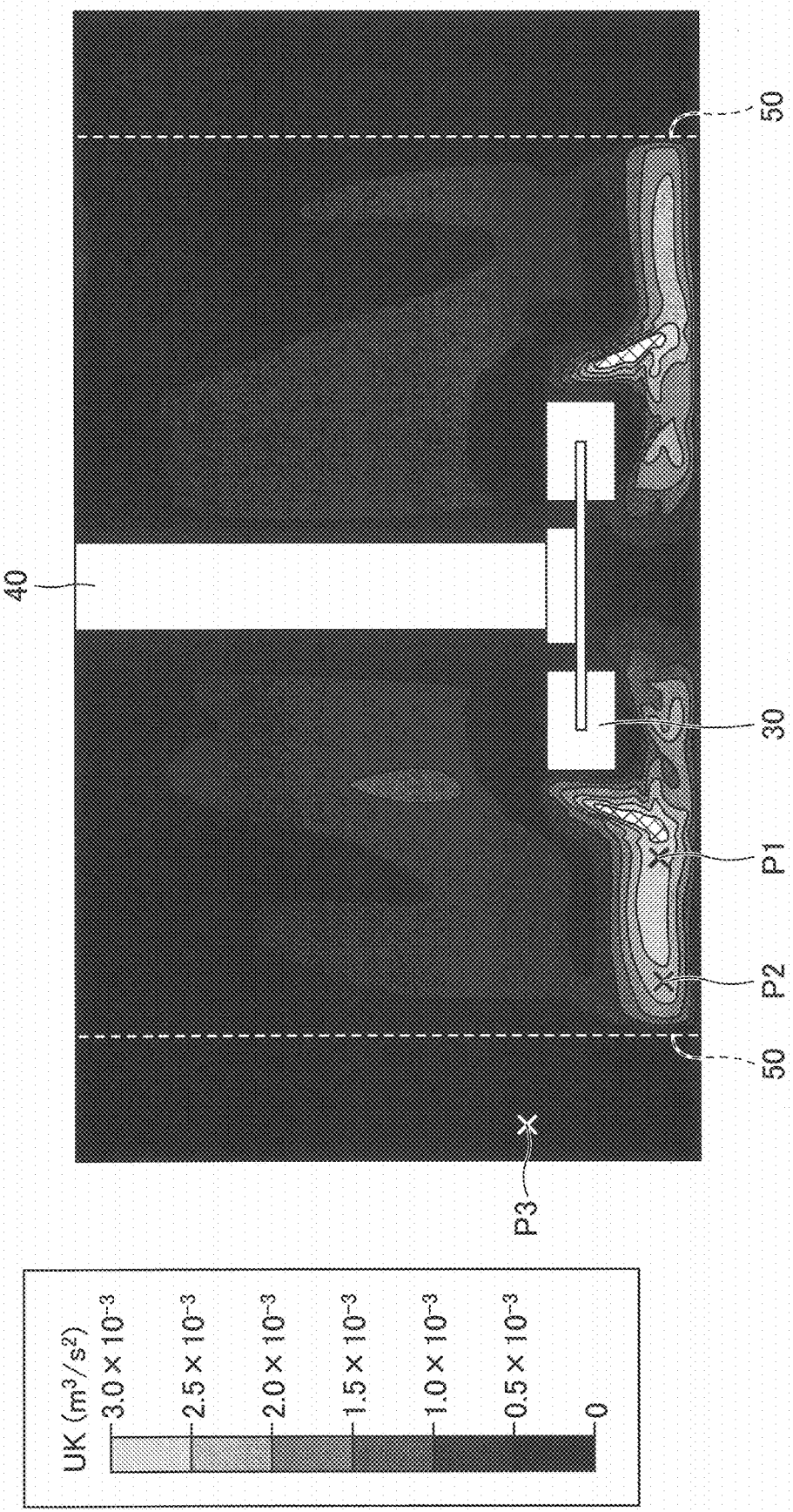
FIG. 3 is a diagram showing the distribution of a value UK associated with a flow field in an agitation tank obtained by simulation according to an embodiment of the present invention.

FIG. 3 shows the distribution of UK in the flow field of the agitation tank according to one embodiment. The cross-hatched regions in FIG. 3 represent regions where the value of UK is greater than or equal to $3.0 \times 10^{-3}$ $m^3/s^2$. The distribution shown in FIG. 3 was obtained by simulation. In the simulation, the volume of the agitation tank 20 was 2 L, a disk-blade turbine impeller was used as the impeller 30, the impeller 30 had six blades, the diameter of the impeller 30 was 80 mm, the vertical distance between the impeller 30 and the bottom portion of the agitation tank 20 was set to 5 mm, and the rotation speed of the impeller 30 was set to 850 rpm.

As shown in FIG. 3, the value of UK in the agitation tank varies depending on the location, and the value of UK tends to be particularly large near the bottom portion 21 of the agitation tank 20. Note that a similar tendency was observed even when agitation conditions such as the type of the impeller 30, the impeller diameter, the volume of the agitation tank 20, and the like were changed.

Table 2 shows the relationship between the value of UK in the vicinity of the discharge port and the volumes V1 and V2 of the highly supersaturated regions in cases where the discharge port is provided in any one of positions P1 through P3 as shown in FIG. 3. The flow rate of liquid supplied from the discharge port was assumed to be the same irrespective of the position of the discharge port.

In Table 2, V1' represents the volume of the first highly supersaturated region, and V2' represents the volume of the second highly supersaturated region. Also, $UK_0$ represents the value of UK when the position of the discharge port is P1, $V1_0'$ represents the value of V1' when the position of the discharge port is P1, and $V2_0'$ represents the value of V2' when the position of the discharge port is P1.

TABLE 2

|  | P1 | P2 | P3 |
|---|---|---|---|
| $UK/UK_0$ | 1.00 | 0.77 | 0.10 |
| $V1'/V1_0'$ | 1.00 | 2.10 | 6.80 |
| $V2'/V2_0'$ | 1.00 | 1.20 | 4.70 |

As can be appreciated from Table 2, the volumes V1' and V2' of the highly supersaturated regions tend to become smaller as the value of UK increases. Such a tendency was similarly observed even when agitation conditions were changed. Also, such a tendency was similarly observed even when the flow rate of the raw material liquid supplied in to the agitation tank was changed.

The inventors of the present invention discovered that the volumes V1' and V2' of the highly supersaturated regions can be reduced by arranging the discharge port of the raw material liquid at a position in the agitation tank where the value of UK is a large value. The larger the value of K, the easier the raw material liquid diffuses, thereby resulting in the reduction of the volumes V1' and V2'. Also, the larger the value of U, the greater the relative amount of solution at the junction of the raw material liquid and the solution, thereby facilitating diffusion of the raw material liquid and resulting in the reduction of the volumes V1' and V2'.

In this respect, for example, as shown in FIGS. 1 and 2, the plurality of discharge parts 22 may be set apart from one another on the bottom portion 21 of the agitation tank 20 and configured to discharge the raw material liquid upward. A discharge port is formed at each of the discharge parts 22 so that the raw material liquid may be discharged upward from each of the discharge ports. The value of UK in the vicinity of the bottom portion 21 of the agitation tank 20 is relatively large, and as such, the volume of the highly supersaturated region can be efficiently reduced. The smaller the volume fraction of the highly supersaturated region, the more gradual the particle component precipitates. In this way, the quality of particles may be improved.

As shown in FIG. 1, the plurality of discharge parts 22 may be disposed radially outward with respect to the impeller 30 in top view. Because a flow that flows radially outward is formed by the rotation of the impeller 30, the value of UK is particularly large on the radially outer side of the impeller 30, and as such, the volume of the highly supersaturated region can be more efficiently reduced. It can also be appreciated from FIG. 3 that the value of UK is particularly large at the radially outer side of the impeller 30.

As shown in FIG. 1, the plurality of discharge parts 22 may be disposed radially inward with respect to the baffle 50 in top view. Because the baffle 50 obstructs the flow and reduces the flow speed, the value of UK is particularly large at the radially inner side of the baffle 50, and as such, the volume of the highly supersaturated region can be more efficiently reduced. It can also be appreciated from FIG. 3 that the value of UK is particularly large at the radially inner side of the baffle 50.

Note that although the plurality of discharge parts 22 protrude from the bottom portion 21 of the agitation tank 20 in FIG. 2, the discharge parts 22 do not necessarily have to protrude from the bottom portion 21. Also, although the plurality of discharge parts 22 are formed on the bottom portion 21 of the agitation tank 20 in FIG. 2, the discharge parts 22 may alternatively be formed into a doughnut-shaped plated in top view and arranged on the bottom portion 21 of the agitation tank 20, for example.

FIG. 4 is a flowchart showing a method for producing a nickel-containing hydroxide according to an embodiment of the present invention. The method for producing a nickel-containing hydroxide shown in FIG. 4 is a method for obtaining nickel-containing hydroxide particles by neutralization crystallization, and includes a nucleation step S11 for generating nuclei of particles and a particle growth step S12 for promoting growth of the particles. Each of the above steps will be described below after describing the nickel-containing hydroxide to be obtained.

(Nickel-Containing Hydroxide)

The nickel-containing hydroxide is used as a precursor of the positive-electrode active material of a lithium ion secondary battery. The nickel-containing hydroxide may be (1) a nickel composite hydroxide that contains nickel (Ni), cobalt (Co), and aluminum (Al) at an amount ratio (mole ratio) of Ni:Co:Al=(1-x-y):x:y (where $0 \leq x \leq 0.3$, $0.005 \leq y \leq 0.15$), or (2) a nickel-cobalt-manganese composite hydroxide that contains nickel (Ni), cobalt (Co), and manganese (Mn), and element M (where M denotes at least one additional element selected from a group consisting of Ti, V, Cr, Zr, Nb, Mo, Hf, Ta, and W) at an amount ratio (mole ratio) of Ni:Co:Mn:M=x:y:z:t (where $x+y+z+t=1$, $0.1 \leq x \leq 0.7$, $0.1 \leq y \leq 0.5$, $0.1 \leq z \leq 0.8$, $0 \leq t \leq 0.02$), for example.

The amount of hydroxide ions included in a nickel-containing hydroxide according to one embodiment may normally have a stoichiometric ratio, but the amount of hydroxide ions may be excessive or deficient to the extent that no substantial influence is cast on the present embodiment. Also, a part of the hydroxide ions may be replaced with anions (e.g., carbonate ions, sulfate ions, etc.) to the extent that no substantial influence is cast on the present embodiment.

The nickel-containing hydroxide according to one embodiment may be a single phase of a nickel-containing hydroxide (or substance primarily containing a nickel-containing hydroxide) as measured by X-ray diffraction (XRD).

The nickel-containing hydroxide contains nickel, and preferably further contains a metal other than nickel. A nickel-containing hydroxide further containing a metal other than nickel will be referred to as a nickel composite hydroxide. Because the metal composition ratio of the nickel composite hydroxide (e.g., Ni:Co:Mn:M) will be maintained even in the positive electrode active material to be obtained, the metal composition ratio of the nickel composite hydroxide is preferably adjusted to match the desired metal composition ratio of the positive electrode active material.

(Method for Producing Nickel-Containing Hydroxide)

As described above, the method for producing a nickel-containing hydroxide includes a nucleation step S11 and a particle growth step S12. In the present embodiment, the nucleation step S11 and the particle growth step S12 are carried out separately by using a batch agitation tank and controlling the pH value of the aqueous solution in the agitation tank, for example.

In the nucleation step S11, nucleation takes precedence over particle growth and particle growth hardly occurs. On the other hand, in the particle growth step S12, particle growth takes precedence over nucleation and new nuclei are hardly generated. By performing the nucleation step S11 and the particle growth step S12 separately, homogenous nuclei with a narrow particle size distribution range may be formed, and the nuclei may be homogenously grown thereafter.

In the following, the nucleation step S11 and the particle growth step S12 will be described. Note that the pH value range of the aqueous solution in the agitation tank during the nucleation step S11 and the pH value range of the aqueous solution in the agitation tank during the particle growth step S12 are different, but the ammonia concentration range and the temperature range of the aqueous solution may be substantially the same.

Note that although a batch agitation tank is used in the present embodiment, a continuous agitation tank may be used as well. When a continuous agitation tank is used, the nucleation step S11 and the particle growth step S12 are carried out at the same time. In this case, the pH value range of the aqueous solution in the agitation tank will naturally be the same and may be in a range around 12.0, for example.

(Nucleation Step)

First, a raw material liquid is prepared. The raw material liquid contains at least a nickel salt, and preferably further contains a metal salt other than the nickel salt. The metal salt may be a nitrate, a sulfate, a hydrochloride, or the like. More specifically, for example, nickel sulfate, manganese sulfate, cobalt sulfate, aluminum sulfate, titanium sulfate, ammonium peroxotitanate, potassium titanium oxalate, vanadium sulfate, ammonium vanadate, chromium sulfate, potassium chromate, zirconium sulfate, zirconium nitrate, niobium oxalate, ammonium molybdate, hafnium sulfate, sodium tantalate, sodium tungstate, ammonium tungstate, and the like may be used as the metal salt.

Because the metal composition ratio of the raw material liquid (e.g., Ni:Co:Mn:M) is maintained even in the nickel composite hydroxide to be obtained, the metal composition ratio of the raw material liquid is adjusted to match the desired metal composition ratio of the nickel composite hydroxide.

Also, a mixed aqueous solution obtained by supplying and mixing an alkaline aqueous solution, an aqueous ammonia solution, and water is stored in an agitation tank. The mixed aqueous solution is hereinafter referred to as "pre-reaction aqueous solution". The pH value of the pre-reaction aqueous solution is adjusted to be within the range from 12.0 to 14.0, and preferably within the range from 12.3 to 13.5, at a liquid temperature of 25° C. as the reference temperature. Also, the concentration of ammonia in the pre-reaction aqueous solution is preferably adjusted to be within the range from 3 g/L to 25 g/L, more preferably within the range from 5 g/L to 20 g/L, and more preferably within the range from 5 g/L to 15 g/L. Further, the temperature of the pre-reaction aqueous solution is preferably adjusted to be within the range from 20° C. to 60° C., and more preferably within the range from 35° C. to 60° C.

The alkaline aqueous solution may be an aqueous solution containing an alkali metal hydroxide such as sodium hydroxide, potassium hydroxide, or the like. The alkali metal hydroxide may be supplied as a solid but is preferably supplied as an aqueous solution.

The ammonia aqueous solution may be an aqueous solution containing an ammonia supplier. The ammonia supplier may be, for example, ammonia, ammonium sulfate, ammonium chloride, ammonium carbonate, ammonium fluoride, or the like.

Note that in the present embodiment, an ammonia supplier is used as a non-reducing complexing agent. However, in other embodiments, ethylenediaminetetraacetic acid, nitrito triacetic acid, uracil diacetic acid, glycine, or the like may be used, for example. That is, any non-reducing complexing agent that is capable of bonding with a nickel ion or the like to form a complex in an aqueous solution accommodated in an agitation tank may be used.

After adjusting the pH value, the ammonia concentration, the temperature, and the like of the pre-reaction aqueous solution, the raw material liquid is supplied into the agitation tank while agitating the pre-reaction aqueous solution. In this way, the pre-reaction aqueous solution and the raw material liquid may be mixed together to form a reaction aqueous solution in the agitation tank, and the nucleation step S11 of generating nuclei by neutralization crystallization may be started.

In the nucleation step S11, when the pH value of the reaction aqueous solution is greater than or equal to 12.0, nucleation takes precedence over particle growth. Also, in the nucleation step S11, when the pH value of the reaction aqueous solution is less than or equal to 14.0, the nuclei may be prevented from becoming too fine, and gelation of the reaction aqueous solution may be prevented. In the nucleation step S11, the fluctuation range (the range between the maximum value and the minimum value) of the pH value of the reaction aqueous solution is preferably less than or equal to 0.4.

Also, in the nucleation step S11, when the ammonia concentration in the reaction aqueous solution is greater than or equal to 3 g/L, the solubility of metal ions may be kept constant and generation of nuclei with accurate shapes and particle diameters may be promoted. Also, in the nucleation step S11, when the ammonia concentration in the reaction aqueous solution is less than or equal to 25 g/L, the amount of metal ions remaining in the aqueous solution without precipitating may be reduced and production efficiency may be improved. In the nucleation step S11, the fluctuation range (the range between the maximum value and the minimum value) of the ammonia concentration of the reaction aqueous solution is preferably less than or equal to 5 g/L.

Also, in the nucleation step S11, when the temperature of the reaction aqueous solution is greater than or equal to 20° C., the nickel-containing hydroxide may be substantially soluble in the reaction aqueous solution such that nucleation may be gradual and nucleation may be easily controlled. Also, when the temperature of the reaction aqueous solution is less than or equal to 60° C., volatilization of ammonia may be prevented so that the amount of ammonia water used may be reduced and production costs may be reduced.

In the nucleation step S11, an alkaline aqueous solution and an ammonia aqueous solution are supplied to the agitation tank in addition to the raw material liquid so that the pH value, the ammonia concentration, and the temperature of the reaction aqueous solution can be maintained within the above ranges. In this way, nucleation may be continued in the reaction aqueous solution. After a predetermined amount of nuclei are generated, the nucleation step S11 is ended. Note that whether the predetermined amount of nuclei has been generated can be estimated based on the amount of metal salt supplied.

(Particle Growth Step)

After completing the nucleation step S11 and before starting the particle growth step S12, the pH value of the reaction aqueous solution in the agitation tank is adjusted to be lower than the pH value of the reaction aqueous solution during the nucleation step S11 and is adjusted to be within the range from 10.5 to 12.0, and more preferably within the range from 11.0 to 12.0, at a liquid temperature of 25° C. as the reference temperature. The pH value may be adjusted by stopping the supply of the alkaline aqueous solution into the agitation tank, or supplying an inorganic acid having the metal of metal salt replaced with hydrogen (e.g., sulfuric acid in the case where the metal salt is a sulfate) into the agitation tank, for example.

After adjusting the pH value, the ammonia concentration, the temperature, and the like of the reaction aqueous solution, the raw material liquid is supplied into the agitation tank while agitating the reaction aqueous solution. In this way, the nuclei may start growing (particle growth) through neutralization crystallization, and the particle growth step S12 may be started. Note that although the nucleation step S11 and the particle growth step S12 are carried out in the same agitation tank in the present embodiment, the above steps may also be performed in different agitation tanks.

In the particle growth step S12, when the pH value of the reaction aqueous solution is less than or equal to 12.0 and is lower than the pH value of the reaction aqueous solution during the nucleation step S11, new nuclei are hardly generated and particle growth takes precedence over nucleation.

Note that when the pH value of the reaction aqueous solution is 12.0, the reaction aqueous solution is at a boundary condition between nucleation and particle growth, and as such, whether nucleation or particle growth will take precedence depends on the presence or absence of nuclei in the reaction aqueous solution. For example, when the pH value of the reaction aqueous solution during the nucleation step S11 is adjusted to be higher than 12.0 to promote the generation of a large amount nuclei, and the pH value of the reaction aqueous solution is thereafter adjusted to 12.0 for the particle growth step S12, particle growth will take precedence because a large amount of nuclei are present in the reaction aqueous solution. On the other hand, when nuclei are not present in the aqueous reaction solution, i.e., when the pH value of the reaction aqueous solution during the nucleation step S11 is adjusted to 12.0, nucleation will take precedence because there are no nuclei to be grown. Thereafter, when the pH value of the reaction aqueous solution is adjusted to be less than 12.0 for the particle growth step S12, the generated nuclei may be grown. In order to clearly separate nucleation and particle growth, the pH value in the particle growth step is preferably adjusted to be lower than the pH value in the nucleation step by a difference of at least 0.5, and more preferably by a difference of at least 1.0.

Also, when the pH value of the reaction aqueous solution is greater than or equal to 10.5 in the particle growth step S12, metal ions remaining in the solution without precipitation may be reduced owing to their low solubility in ammonium, and production efficiency may be improved.

In the particle growth step S12, an alkaline aqueous solution and an ammonia aqueous solution are supplied into the agitation tank in addition to the raw material liquid so that the pH value, the ammonia concentration, and the temperature of the reaction aqueous solution may be maintained within the above ranges. In this way, particle growth may be continued in the reaction aqueous solution.

The particle growth step S12 can be divided into a first half and a second half by switching the atmosphere in the agitation tank. In the first half of the particle growth step, the atmosphere is an oxidizing atmosphere similar to that in the nucleation step S11. The oxygen concentration in the oxidizing atmosphere is greater than or equal to 1 vol %, more preferably greater than or equal to 2 vol %, and more preferably greater than or equal to 10 vol %. The oxidizing atmosphere may be an ambient air atmosphere (oxygen concentration: 21 vol %), which is easy to control, for example. The upper limit of the oxygen concentration of the oxidizing atmosphere is not particularly limited but may be less than or equal to 30 vol %, for example. On the other hand, in the second half of the particle growth step, the atmosphere is switched to a non-oxidizing atmosphere. The oxygen concentration in the non-oxidizing atmosphere is less than or equal to 1 vol %, more preferably less than or equal to 0.5 vol %, and more preferably less than or equal to 0.3 vol %. The oxygen concentration in the non-oxidizing atmosphere may be controlled by mixing oxygen gas or ambient air and an inert gas, for example.

FIG. 5 is a schematic cross-sectional view of an aggregate formed in the first half of the particle growth step according to an embodiment of the present invention. FIG. 6 is a schematic cross-sectional view of an outer shell formed in the second half of the particle growth step according to an embodiment of the present invention.

In the first half of the particle growth step S12, seed crystal particles 2 are formed by promoting growth of nuclei, and as the seed crystal particles 2 increase in size, the seed crystal particles 2 start to collide with each other to form an aggregate 4 made up of a plurality of the seed crystal particles 2. On the other hand, in the second half of the particle growth step S12, a fine outer shell 6 is formed around the aggregate 4. As a result, particles each made up of the aggregate 4 and the outer shell 6 are obtained.

Note that the structure of the nickel-containing hydroxide particle is not limited to the structure shown in FIG. 6. For example, when the nucleation step S11 and the particle growth step S12 are performed at the same time, the particle structure obtained upon completion of neutralization crystallization may be a different structure from the particle structure shown in FIG. 6. For example, structures corresponding to the seed crystal particles 2 and structures corresponding to the outer shells 6 may be merged and less distinguishable such that a more undifferentiated structure may be obtained.

The particle growth step S12 is ended at the time the nickel-containing hydroxide particles have grown to a predetermined particle diameter. The particle diameter of the nickel-containing hydroxide particles may be estimated based on the amount of metal salt supplied in the nucleation step S11 and the particle growth step S12.

Note that after the nucleation step S11 and during the particle growth step S12, the supply of the raw material liquid may be stopped and the agitation of the reaction aqueous solution may be stopped to cause the particles to settle and to discharge the supernatant liquid above the settled particles. In this way, the metal ion concentration in the reaction aqueous solution may be increased after the metal ion concentration has decreased by neutralization crystallization.

FIG. 7 is a diagram showing a first highly supersaturated region in the reaction aqueous solution during the nucleation step according to an embodiment of the present invention. Note that the arrows in FIG. 7 represent the direction of flow in the vicinity of the discharge part 22.

The first highly supersaturated region 12A represents a region in the reaction aqueous solution where the molar concentration of the nickel-containing hydroxide dissolved in the reaction aqueous solution is greater than or equal to 5.0 mol/m$^3$. In the first highly supersaturated region 12A, the nickel-containing hydroxide exists at a sufficiently higher molar concentration than its solubility, and as such, nucleation occurs at a significant rate.

Note that the solubility of the nickel-containing hydroxide refers to the maximum amount of the nickel-containing hydroxide soluble in 100 g of water (g/100 g-H$_2$O). For example, the solubility of nickel hydroxide (Ni(OH)$_2$) is 10$^{-7}$ (g/100 g-H$_2$O). As can be appreciated, the solubility of the nickel-containing hydroxide is close to zero, and the concentration of the nickel-containing hydroxide at solubility is so low as to be negligible as compared to 5.0 mol/m$^3$, which is the minimum molar concentration of the nickel-containing hydroxide in the first highly supersaturated region 12A.

Figure 8:
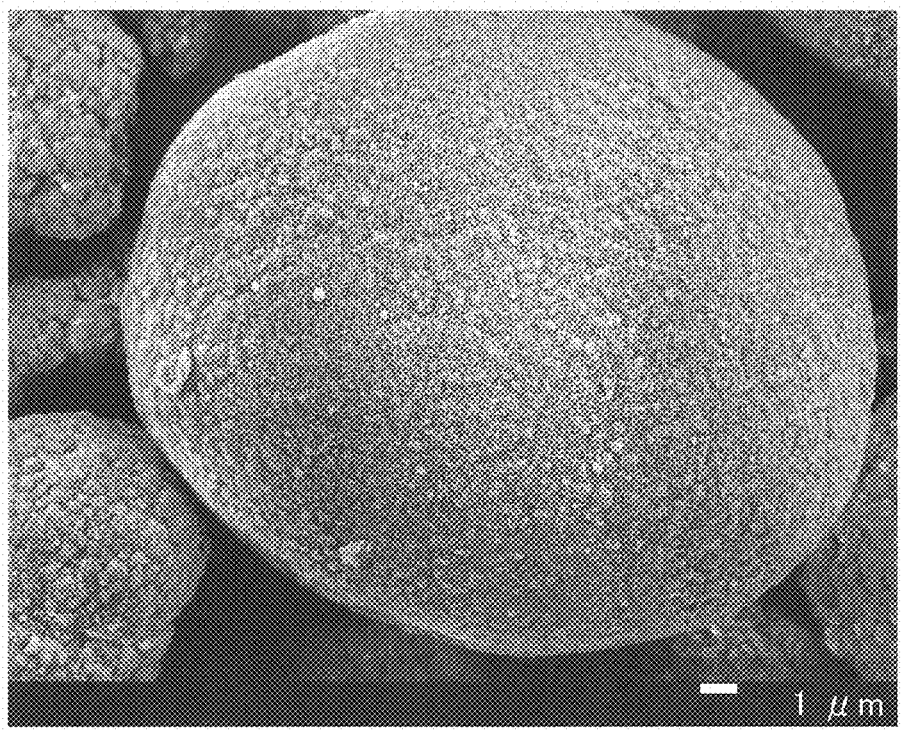
FIG. 8 is an SEM image of an example particle obtained in a case where the volume fraction of the first highly supersaturated region in the reaction aqueous solution accommodated in a continuous agitation tank was 0.025% of the reaction aqueous solution.
Figure 9:
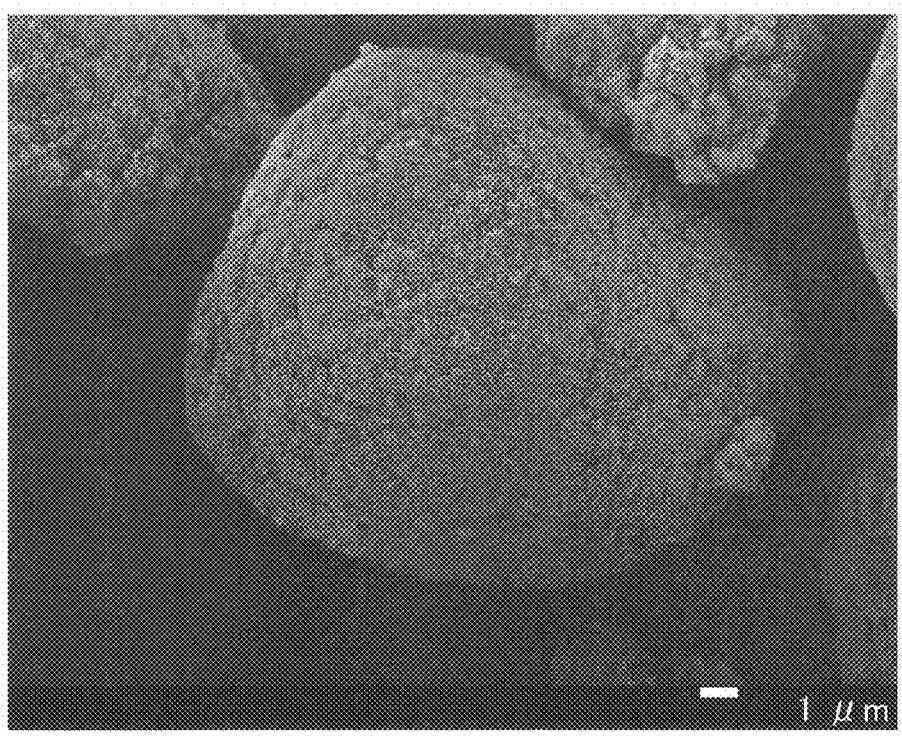
FIG. 9 is an SEM image of an example particle obtained in a case where the volume fraction of the first highly supersaturated region in the reaction aqueous solution accommodated in the continuous agitation tank was 0.100% of the reaction aqueous solution.

FIG. 8 is an SEM image of an example particle obtained in Example 1-1; i.e., a case where the volume fraction of the first highly supersaturated region in the reaction aqueous solution accommodated in a continuous agitation tank was 0.025% of the reaction aqueous solution. The outer surface of the particle shown in FIG. 8 was smooth and hardly any roughness was observed. On the other hand, FIG. 9 is an SEM image of an example particle obtained in Comparative Example 1; i.e., a case where the volume fraction of the first highly supersaturated region in the reaction aqueous solution accommodated in the continuous agitation tank was 0.100% of the reaction aqueous solution. Roughness can be clearly observed at the outer surface of the particle shown in FIG. 9

As can be appreciated from FIGS. 8 and 9, in terms of preventing the generation of roughness at the outer surfaces of particles obtained at the completion of neutralization crystallization, the volume fraction of the first highly supersaturated region in the reaction aqueous solution during the nucleation step S11 (hereinafter referred to as "first volume fraction") is preferably less than 0.100%. The following may be a possible explanation as to why the generation of roughness at the outer surfaces of the particles obtained at the completion of neutralization crystallization can be prevented when the first volume fraction is less than 0.100%.

In the nucleation step S11, nuclei are mainly generated in the first highly supersaturated region 12A and then dispersed throughout the reaction aqueous solution. When the first volume fraction is less than 0.100%, the number of nuclei generated per unit volume of the reaction aqueous solution is relatively small. As such, in the first half of the particle growth step S12, the number of the seed crystal particles 2 generated per unit volume of the reaction aqueous solution is relatively small, and the number of the aggregates 4 formed by the seed crystal particles 2 is also relatively small. As a result, in the second half of the particle growth step S12, the outer shells 6 that are formed around the aggregates 4 become relatively thick.

The thickening of the outer shells 6 may be attributed to the fact that the proportion of the material for forming the outer shell 6 supplied per aggregate 4 varies depending on the number of aggregates 4 that are present as growth starting points for the outer shells 6; i.e., whether a small number of aggregates 4 or a large number of aggregates 4 are present. When a small number of aggregates 4 are present, the proportion of the material for forming the outer shell 6 supplied per aggregate 4 is higher as compared with the case where a large number of aggregates 4 are present. As such, when a small number of aggregates 4 are present, the outer shells 6 of the individual aggregates 4 can be thickened.

Thus, by controlling the first volume fraction to be less than 0.100% to thereby reduce the number of nuclei generated, the rough outer surfaces of the aggregates 4 may be covered with thick outer shells 6 such that the roughness of the outer surfaces of the particles that are ultimately obtained may be reduced. Note that such an effect may be obtained even when the nucleation step S11 and the particle growth step S12 are performed at the same time.

In terms of reducing the roughness of the outer surfaces of particles obtained at the completion of neutralization crystallization, the first volume fraction is preferably arranged to be as small as possible. The first volume fraction depends on factors such as the values U and K of the flow field in the vicinity of the discharge part 22. That is, the larger the values of U and K, the smaller the first volume fraction. The first volume fraction is preferably less than or equal to 0.070%, more preferably less than or equal to 0.050%, and more preferably less than or equal to 0.030%. However, because the value of U and K are restricted by the capacity of the motor for rotating the shaft 40 and the like, the first volume fraction 12 is preferably greater than or equal to 0.004%.

In the nucleation step S11, the raw material liquid may be divided and discharged from the plurality of discharge parts 22 into the reaction aqueous solution. In this way, the first volume fraction can be efficiently reduced. At this time, the distance between the discharge parts 22 is preferably set up so that the plurality of first highly supersaturated regions 12A discharged from the plurality of discharge parts 22 do not overlap with each other.

Figure 10:
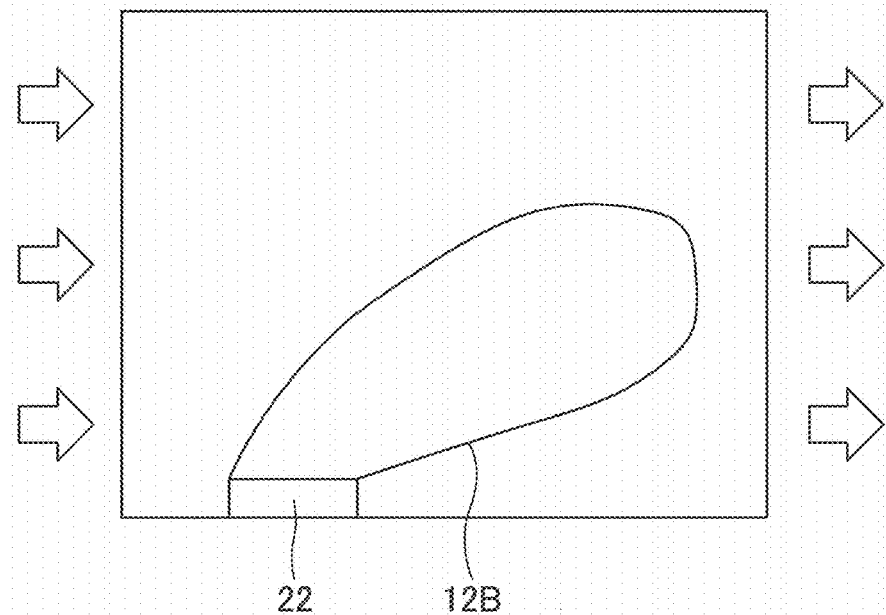
FIG. 10 is a diagram showing a second highly supersaturated region in the reaction aqueous solution during the particle growth step according to an embodiment of the present invention.

FIG. 10 is a diagram showing a second highly supersaturated region in the reaction aqueous solution during the particle growth step according to one embodiment. Note that the arrows shown in FIG. 10 represent the direction of flow in the vicinity of the discharge part 22.

The second highly supersaturated region 12B represents a region where the molar concentration of the nickel-containing hydroxide dissolved in the reaction aqueous solution is greater than or equal to 1.7 mol/m$^3$. In the second highly supersaturated region 12B, the nickel-containing hydroxide is present at a sufficiently higher molar concentration than its solubility, and as such, particle growth occurs at a significant rate.

As described above, the solubility of the nickel-containing hydroxide is close to zero, and as such, the concentration of the nickel-containing hydroxide at solubility so low as to be negligible compared to 1.7 mol/m$^3$, which is the minimum molar concentration of the nickel-containing hydroxide in the second highly supersaturated region 12B.

Figure 11:
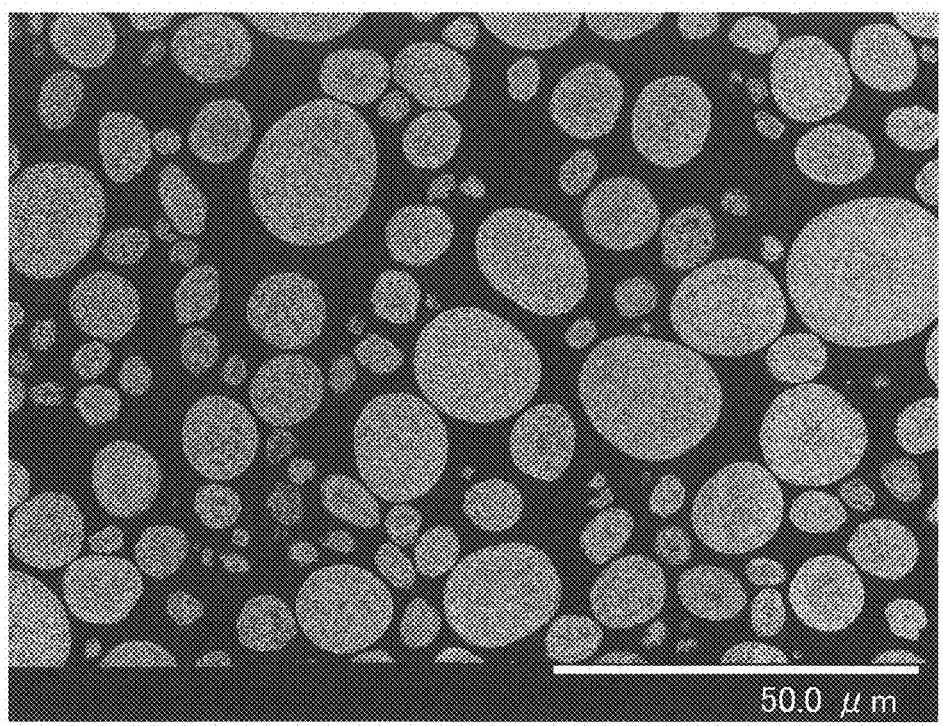
FIG. 11 is an SEM image of cross sections of particles obtained in a case where the volume fraction of the second highly supersaturated region in the reaction aqueous solution accommodated in the continuous agitation tank was 0.379% of the reaction aqueous solution.

FIG. 11 is an SEM image of example cross sections of particles obtained in Example 2-1; i.e., a case where the volume fraction of the second highly supersaturated region in the reaction aqueous solution accommodated in the continuous agitation tank was 0.379% of the reaction aqueous solution. No growth ring-like structures were observed at the cross sections of the particles shown in FIG. 11. On the other hand, FIG. 12 is an SEM image of example cross sections of particles obtained in Comparative Example 2-1; i.e., a case where the volume fraction of the second highly supersaturated region in the reaction aqueous solution accommodated in the continuous agitation tank was 0.624% of the reaction aqueous solution. Growth ring-like structures were observed at the cross sections of the particles shown in FIG. 12 as indicated by the arrows.

As can be appreciated from FIGS. 11 and 12, in terms of preventing the generation of growth ring-like structures, the volume fraction of the second highly supersaturated region 12B in the reaction aqueous solution (hereinafter referred to as the "second volume fraction") is preferably less than 0.624%. The following is a possible explanation as to why the generation of growth ring-like structures can be prevented when the second volume fraction is less than 0.624%.

In the particle growth step S12, particles are dispersed throughout the reaction aqueous solution and grow mainly when passing through the second highly supersaturated region 12B. When the volume fraction of the second highly supersaturated region 12B in the entire reaction aqueous solution is less than 0.624%, the particle growth occurs gradually, and the generation of growth ring-like structures formed by a plurality of layers having different densities can be prevented. Such an effect may be attributed to the fact that by causing the particle growth to occur gradually, changes in the crystal growth orientation and the generation of voids due to such changes may be prevented.

In terms of preventing the generation of growth ring-like structures, the second volume fraction is preferably arranged to be as small as possible. The second volume fraction depends on the values U and K of the flow field in the vicinity of the discharge part 22. That is, the larger the values of U and K, the smaller the second volume fraction. The second volume fraction is preferably less than or equal to 0.600%, more preferably less than or equal to 0.500%, and more preferably less than or equal to 0.400%. However, because the values of U and K are restricted by the capacity of the motor that rotates the shaft 40 and the like, the second volume fraction is preferably greater than or equal to 0.019%.

In the particle growth step S12, the raw material liquid may be divided and discharged from the plurality of discharge parts 22 into the reaction aqueous solution. In this way, the second volume fraction can be efficiently reduced. At this time, the distance between the discharge parts 22 is preferably set up so that the plurality of second highly supersaturated regions 12B discharged from the plurality of discharge parts 22 do not overlap with each other.

EXAMPLES

Example 1-1

In Example 1-1, a nucleation step of generating nuclei of nickel composite hydroxide particles by neutralization crystallization and a particle growth step of promoting growth of the particles were carried out at the same time using an overflow type continuous agitation tank.

The volume of the agitation tank was 200 L, a disk-blade turbine impeller was used, the impeller had six blades, the diameter of the impeller was 250 mm, the vertical distance between the impeller and the inner bottom surface of the agitation tank was 140 mm, and the rotation speed of the impeller was set to 280 rpm.

The agitation tank was filled with 200 L of the reaction aqueous solution, the pH value of the reaction aqueous solution was 11.3, the ammonia concentration of the reaction aqueous solution was 12 g/L, and the temperature of the reaction aqueous solution was maintained at 50° C. The atmosphere around the reaction aqueous solution was arranged to be an ambient air atmosphere.

The raw material liquid was prepared so that a nickel composite hydroxide with the formula $Ni_{0.82}Co_{0.15}Al_{0.03}(OH)_2$ could be obtained. One raw material liquid supply pipe was provided, and the feed rate of the raw material liquid supplied from one raw material liquid supply pipe was set to 400 mL/min.

During the nucleation step and the particle growth step, a sodium hydroxide aqueous solution and ammonia water were supplied into the agitation tank in addition to the raw material liquid so as to maintain the pH value of the reaction aqueous solution and the ammonia concentration of the reaction aqueous solution.

The volume fraction of the first highly supersaturated region in the reaction aqueous solution, calculated by simulation, was 0.025%. Note that the analysis conditions were set up to be the same as the above-described analysis conditions.

FIG. 8 shows an SEM image of nickel composite hydroxide particles obtained in Example 1-1. In FIG. 8, the outer surfaces of particles obtained at the completion of neutralization crystallization were smooth and hardly any roughness was observed.

Example 1-2

In Example 1-2, nickel composite hydroxide particles were produced in the same manner as in Example 1-1 except that the rotation speed of the impeller used in Example 1-1 was set to 150 rpm.

The volume fraction of the first highly supersaturated region in the reaction aqueous solution, calculated by simulation in the same manner as in Example 1-1, was 0.090%. Note that the analysis conditions were set up to be the same as the above-described analysis conditions.

The nickel composite hydroxide particles obtained in Example 1-2 were similar to the nickel composite hydroxide particles obtained in Example 1 as shown in FIG. 8; the outer surfaces of the particles obtained at the completion of neutralization crystallization were smooth and hardly any roughness was observed.

Example 1-3

In Example 1-3, nickel composite hydroxide particles were produced in the same manner as in Example 1-1 except that the raw material liquid was prepared so that a nickel composite hydroxide with the formula $Ni_{0.88}Co_{0.09}Al_{0.03}(OH)_2$ could be obtained.

The volume fraction of the first highly supersaturated region in the reaction aqueous solution, calculated by simulation in the same manner as in Example 1-1, was 0.025%. Note that the analysis conditions were set up to be the same as the above-described analysis conditions.

The nickel composite hydroxide particles obtained in Example 1-3 were also similar to the nickel composite hydroxide particles obtained in Example 1-1 as shown in FIG. 8; the outer surfaces of the particles obtained at the completion of neutralization crystallization were smooth and hardly any roughness was observed.

Example 1-4

In Example 1-4, the volume of the agitation tank was 60 L, a disk-blade turbine impeller was used, the impeller had six blades, the diameter of the impeller was 168 mm, the vertical distance between the impeller and the inner bottom surface of the agitation tank was 100 mm, and the rotation speed of the impeller was set to 425 rpm. The agitation tank was filled with 60 L of the reaction aqueous solution. The raw material liquid was prepared so that a nickel composite hydroxide with the formula $Ni_{0.82}Co_{0.15}Al_{0.03}(OH)_2$ could be obtained. One raw material liquid supply pipe was provided, and the feed rate of the raw material liquid supplied from one raw material liquid supply pipe was set to 120 mL/min. Aside from the above-noted conditions, nickel composite hydroxide particles were produced in the same manner as in Example 1-1.

The volume fraction of the first highly supersaturated region in the reaction aqueous solution, calculated by simulation in the same manner as in Example 1-1, was 0.015%. Note that the analysis conditions were set up to be the same as the above-described analysis conditions.

The nickel composite hydroxide particles obtained in Example 1-4 were also similar to the nickel composite hydroxide particles obtained in Example 1 as shown in FIG. 8; the outer surfaces of the particles obtained at the completion of neutralization crystallization were smooth and hardly any roughness was observed.

Example 1-5

In Example 1-5, the volume of the agitation tank was 60 L, a 45° pitched paddle blade impeller was used, the impeller had four blades, the diameter of the impeller was 168 mm, the vertical distance between the impeller and the inner bottom surface of the agitation tank was 100 mm, and the rotation speed of the impeller was set to 500 rpm. The agitation tank was filled with 60 L of the reaction aqueous solution. The raw material liquid was prepared so that a nickel composite hydroxide with the formula $Ni_{0.82}Co_{0.15}Al_{0.03}(OH)_2$ could be obtained. One raw material liquid supply pipe was provided, and the feed rate of the raw material liquid supplied from one raw material liquid supply pipe was set to 120 mL/min. Aside from the above-noted conditions, nickel composite hydroxide particles were produced in the same manner as in Example 1-1.

The volume fraction of the first highly supersaturated region in the reaction aqueous solution, calculated by simulation in the same manner as in Example 1-1, was 0.027%. Note that the analysis conditions were set up to be the same as the above-described analysis conditions.

The nickel composite hydroxide particles obtained in Example 1-5 were also similar to the nickel composite hydroxide particles obtained in Example 1-1 as shown in FIG. 8; the outer surfaces of the particles obtained at the completion of neutralization crystallization were smooth and hardly any roughness was observed.

Example 1-6

In Example 1-6, nickel composite hydroxide particles were produced in the same manner as in Example 1-1 except that the raw material liquid was prepared so that a nickel composite hydroxide with the formula $Ni_{0.34}Co_{0.33}Al_{0.33}(OH)_2$ could be obtained.

The volume fraction of the first highly supersaturated region in the reaction aqueous solution, calculated by simulation in the same manner as in Example 1, was 0.025%. Note that the analysis conditions were set up to be the same as the above-described analysis conditions.

The nickel composite hydroxide particles obtained in Example 1-6 were also similar to the nickel composite hydroxide particles obtained in Example 1-1 as shown in FIG. 8; the outer surfaces of the particles obtained at the completion of neutralization crystallization were smooth and hardly any roughness was observed.

Example 1-7

In Example 1-7, nickel composite hydroxide particles were produced in the same manner as in Example 1-1 except that the raw material liquid was prepared so that a nickel composite hydroxide with the formula $Ni_{0.60}Co_{0.20}Al_{0.20}(OH)_2$ could be obtained.

The volume fraction of the first highly supersaturated region in the reaction aqueous solution, calculated by simulation in the same manner as in Example 1-1, was 0.025%. Note that the analysis conditions were set up to be the same as the above-described analysis conditions.

The nickel composite hydroxide particles obtained in Example 1-7 were also similar to the nickel composite hydroxide particles obtained in Example 1-1 as shown in FIG. 8; the outer surfaces of the particles obtained at the completion of neutralization crystallization were smooth and hardly any roughness was observed.

Example 1-8

In Example 1-8, the volume of the agitation tank was 60 L, a disk-blade turbine impeller was used, the impeller had six blades, the diameter of the impeller was 168 mm, the vertical distance between the impeller and the inner bottom surface of the agitation tank was 100 mm, and the rotation speed of the impeller was set to 425 rpm. The agitation tank was filled with 60 L of the reaction aqueous solution. The raw material liquid was prepared so that a nickel composite hydroxide with the formula $Ni_{0.34}Co_{0.33}Al_{0.33}(OH)_2$ could be obtained. One raw material liquid supply pipe was provided, and the feed rate of the raw material liquid supplied from one raw material liquid supply pipe was set to 120 mL/min. Aside from the above-noted conditions, nickel composite hydroxide particles were produced in the same manner as in Example 1-1.

The volume fraction of the first highly supersaturated region in the reaction aqueous solution, calculated by simulation in the same manner as in Example 1-1, was 0.015%. Note that the analysis conditions were set up to be the same as the above-described analysis conditions.

The nickel composite hydroxide particles obtained in Example 1-8 were also similar to the nickel composite hydroxide particles obtained in Example 1-1 as shown in FIG. 8; the outer surfaces of the particles obtained at the completion of neutralization crystallization were smooth and hardly any roughness was observed.

Example 1-9

In Example 1-9, the volume of the agitation tank was 60 L, a 45° pitched paddle blade impeller was used, the impeller had four blades, the diameter of the impeller was 168 mm, the vertical distance between the impeller and the inner bottom surface of the agitation tank was 100 mm, and the rotation speed of the impeller was set to 500 rpm. The agitation tank was filled with 60 L of the reaction aqueous solution. The raw material liquid was prepared so that a nickel composite hydroxide with the formula $Ni_{0.34}Co_{0.33}Al_{0.33}(OH)_2$ could be obtained. One raw material liquid supply pipe was provided, and the feed rate of the raw material liquid supplied from one raw material liquid supply pipe was set to 120 mL/min. Aside from the above-noted conditions, nickel composite hydroxide particles were produced in the same manner as in Example 1-1.

The volume fraction of the first highly supersaturated region in the reaction aqueous solution, calculated by simulation in the same manner as in Example 1-1, was 0.027%. Note that the analysis conditions were set up to be the same as the above-described analysis conditions.

The nickel composite hydroxide particles obtained in Example 1-9 were also similar to the nickel composite hydroxide particles obtained in Example 1-1 as shown in FIG. 8; the outer surfaces of the particles obtained at the completion of neutralization crystallization were smooth and hardly any roughness was observed.

Comparative Example 1-1

In Comparative Example 1-1, nickel composite hydroxide particles were produced in the same manner as in Example 1-1 except that the feed rate of the raw material liquid from one raw material liquid supply pipe was set to 800 mL/min.

The volume fraction of the first highly supersaturated region in the reaction aqueous solution, calculated by simulation in the same manner as in Example 1-1, was 0.100%.

FIG. 9 shows an SEM image of the nickel composite hydroxide particles obtained in Comparative Example 1-1. As can be appreciated from FIG. 9, roughness could be observed clearly at the outer surfaces of the particles obtained at the completion of neutralization crystallization.

Comparative Example 1-2

In Comparative Example 1-2, nickel composite hydroxide particles were produced in the same manner as in Example 1 except that the raw material liquid was prepared so that a nickel composite hydroxide with the formula $Ni_{0.34}Co_{0.33}Mn_{0.33}(OH)_2$ could be obtained, and the feed rate of the raw material liquid from one raw material liquid supply pipe was set to 800 mL/min.

The volume fraction of the first highly supersaturated region in the reaction aqueous solution, calculated by simulation in the same manner as in Example 1-1, was 0.100%.

The nickel composite hydroxide particles obtained in Comparative Example 1-2 was substantially similar to the particles obtained in Comparative Example 1-1 as shown in FIG. 9, and roughness could be observed clearly at the outer surfaces of the particles obtained at the completion of neutralization crystallization.

[Summary]

As can be appreciated from Examples 1-1 to 1-9 and Comparative Examples 1-1 and 1-2, as long as the volume fraction of the first highly supersaturated region in the reaction aqueous solution is less than 0.100%, the roughness of the outer surfaces of particles can be reduced even if the type of impeller, the diameter of the impeller, and the volume of the agitation tank are changed.

Example 2-1

In Example 2-1, a nucleation step of generating nuclei of nickel composite hydroxide particles by neutralization crystallization and a particle growth step of promoting growth of the particles were carried out at the same time using an overflow type continuous agitation tank.

The volume of the agitation tank was 200 L, a disk-blade turbine impeller was used, the impeller had six blades, the diameter of the impeller was 250 mm, the vertical distance between the impeller and the inner bottom surface of the agitation tank was 140 mm, and the rotation speed of the impeller was set to 280 rpm.

The agitation tank was filled with 200 L of the reaction aqueous solution, the pH value of the reaction aqueous solution was 11.8, the ammonia concentration of the reaction aqueous solution was 12 g/L, and the temperature of the reaction aqueous solution was maintained at 50° C. The atmosphere around the reaction aqueous solution was arranged to be a nitrogen atmosphere.

The raw material liquid was prepared so that a nickel composite hydroxide with the formula $Ni_{0.82}Co_{0.15}Al_{0.03}(OH)_2$ could be obtained, and the total metal ion concentration of the raw material liquid was adjusted to 2.0 mol/L. Two raw material liquid supply pipes were provided, and the feed rate of the raw material liquid supplied from one raw material liquid supply pipe was set to 400 mL/min so that the total feed rate of the raw material liquid from the two raw material liquid supply pipes was 800 mL/min.

During the nucleation step and the particle growth step, a sodium hydroxide aqueous solution and ammonia water were supplied into the agitation tank in addition to the raw material liquid so as to maintain the pH value of the reaction aqueous solution and the ammonia concentration of the reaction aqueous solution.

The volume fraction of the second highly supersaturated region in the reaction aqueous solution, calculated by simulation, was 0.379%. Note that the analysis conditions were set up to be the same as the above-described analysis conditions.

FIG. 11 shows an SEM image of cross sections of nickel composite hydroxide particles obtained in Example 2-1. In FIG. 11, growth ring-like structures were not observed in the cross sections of the obtained particles. Note that the tap density of the obtained nickel composite hydroxide was 1.40 g/cc.

Example 2-2

In Example 2, nickel composite hydroxide particles were produced in the same manner as in Example 2-1 except that only one raw material liquid supply pipe was provided, and the feed rate of the raw material liquid from one raw material liquid supply pipe was set to 400 mL/min.

The volume fraction of the second highly supersaturated region in the reaction aqueous solution, calculated by simulation in the same manner as in Example 2-1, was 0.190%.

No growth ring-like structures in the cross sections of particles were observed from an SEM image of the cross sections of the obtained nickel composite hydroxide particles.

Example 2-3

In Example 2-3, nickel composite hydroxide particles were produced in the same manner as in Example 2-1 except that the volume of the agitation tank was 60 L, the diameter of the impeller was 160 mm, the vertical distance between the impeller and the inner bottom surface of the agitation tank was 60 mm, the rotation speed of the impeller was set to 375 rpm, only one raw material liquid supply pipe was provided, and the feed rate of the raw material liquid from one raw material liquid supply pipe was set to 97 mL/min.

The volume fraction of the second highly supersaturated region in the reaction aqueous solution, calculated by simulation, was 0.100%.

No growth ring-like structures in the cross sections of particles were observed from an SEM image of the cross sections of the obtained nickel composite hydroxide particles.

Example 2-4

In Example 2-4, nickel composite hydroxide particles were produced in the same manner as in Example 2-3 except that the rotation speed of the impeller was set to 325 rpm.

The volume fraction of the second highly supersaturated region in the reaction aqueous solution, calculated by simulation in the same manner as in Example 2-1, was 0.134%.

No growth ring-like structures in the cross sections of particles were observed from an SEM image of the cross sections of the obtained nickel composite hydroxide particles.

Example 2-5

In Example 2-5, nickel composite hydroxide particles were produced in the same manner as in Example 2-1 except that the raw material liquid was prepared so that a nickel composite hydroxide with the formula $Ni_{0.88}Co_{0.09}Al_{0.03}(OH)_2$ could be obtained.

The volume fraction of the highly supersaturated region in the reaction aqueous solution, calculated by simulation in the same manner as in Example 2-1, was 0.379%.

No growth ring-like structures in the cross sections of particles were observed from an SEM image of the cross sections of the obtained nickel composite hydroxide particles.

Example 2-6

In Example 2-6, nickel composite hydroxide particles were produced in the same manner as in Example 2-1 except that the rotation speed of the impeller was set to 220 rpm.

The volume fraction of the second highly supersaturated region in the reaction aqueous solution, calculated by simulation in the same manner as in Example 2-1, was 0.600%. Note that the analysis conditions were set up to be the same as the above-described analysis conditions.

No growth ring-like structures in the cross sections of particles were observed from an SEM image of the cross sections of the obtained nickel composite hydroxide particles.

Example 2-7

In Example 2-7, the volume of the agitation tank was 60 L, a 45° pitched paddle blade impeller was used, the impeller had four blades, the diameter of the impeller was 168 mm, the vertical distance between the impeller and the inner bottom surface of the agitation tank was 100 mm, and the rotation speed of the impeller was set to 400 rpm. Also, the agitation tank was filled with 60 L of the reaction aqueous liquid. Aside from the above-noted conditions, nickel composite hydroxide particles were produced in the same manner as in Example 2-3.

The volume fraction of the second highly supersaturated region in the reaction aqueous solution, calculated by simulation in the same manner as in Example 2-1, was 0.205%. Note that the analysis conditions were set up to be the same as the above-described analysis conditions.

Example 2-8

In Example 2-8, nickel composite hydroxide particles were produced in the same manner as in Example 2-1 except that the raw material liquid was adjusted so that a nickel composite hydroxide with the formula $Ni_{0.34}Co_{0.33}Mn_{0.33}(OH)_2$ could be obtained.

The volume fraction of the second highly supersaturated region in the reaction aqueous solution, calculated by simulation in the same manner as in Example 1, was 0.379%. Note that the analysis conditions were set up to be the same as the above-described analysis conditions.

The nickel composite hydroxide particles obtained in Example 2-8 were also similar to the particles obtained in Example 2-1 as shown in FIG. 11, and no growth ring-like structures in the cross sections of particles were observed. Note that the tap density of the obtained nickel composite hydroxide was 1.40 g/cc.

Example 2-9

In Example 2-9, nickel composite hydroxide particles were produced in the same manner as in Example 2-1 except that the raw material liquid was prepared so that a nickel composite hydroxide with the formula $Ni_{0.60}Co_{0.20}Mn_{0.20}(OH)_2$ could be obtained.

The volume fraction of the second highly supersaturated region in the reaction aqueous solution, calculated by simulation in the same manner as in Example 2-1, was 0.379%. Note that the analysis conditions were set up to be the same as the above-described analysis conditions.

The nickel composite hydroxide particles obtained in Example 2-9 were also similar to the particles obtained in Example 2-1 as shown in FIG. 11, and no growth ring-like structures in the cross sections of particles were observed. Note that the tap density of the obtained nickel composite hydroxide was 1.40 g/cc.

Example 2-10

In Example 2-10, the volume of the agitation tank was 60 L, a disk-blade turbine impeller was used, the impeller had six blades, the diameter of the impeller was 168 mm, the vertical distance between the impeller and the inner bottom surface of the agitation tank was 60 mm, and the rotation speed of the impeller was set to 375 rpm. The agitation tank was filled with 60 L of the reaction aqueous solution. The raw material liquid was adjusted so that a nickel composite hydroxide with the formula $Ni_{0.34}Co_{0.33}Mn_{0.33}(OH)_2$ could be obtained. Also, only one raw material liquid supply pipe was provided, and the feed rate of the raw material liquid supplied from one raw material liquid supply pipe was set to 97 mL/min. Aside from the above-noted conditions, nickel composite hydroxide particles were produced in the same manner as in Example 2-1.

The volume fraction of the second highly supersaturated region in the reaction aqueous solution, calculated by simulation in the same manner as in Example 2-1, was 0.100%. Note that the analysis conditions were set up to be the same as the above-described analysis conditions.

The nickel composite hydroxide particles obtained in Example 2-10 were also similar to the particles obtained in Example 2-1 as shown in FIG. 11, and no growth ring-like structures were observed in the cross sections of the particles obtained at the completion of neutralization crystallization.

Example 2-11

In Example 2-11, the volume of the agitation tank was 60 L, a 45° pitched paddle blade impeller was used, the impeller had four blades, the diameter of the impeller was 168 mm, the vertical distance between the impeller and the inner bottom surface of the agitation tank was 100 mm, and the rotation speed of the impeller was set to 400 rpm. Also, the agitation tank was filled with 60 L of the reaction aqueous solution. The raw material liquid was prepared so that a nickel composite hydroxide with the formula $Ni_{0.34}Co_{0.33}Mn_{0.33}(OH)_2$ could be obtained. Also, one raw material liquid supply pipe was provided, and the feed rate of the raw material liquid from one raw material liquid supply pipe was set to 97 mL/min. Aside from the above-noted conditions, nickel composite hydroxide particles were produced in the same manner as in Example 2-3.

The volume fraction of the second highly supersaturated region in the reaction aqueous solution, calculated by simulation in the same manner as in Example 2-1, was 0.205%. Note that the analysis conditions were set up to be the same as the above-described analysis conditions.

The nickel composite hydroxide particles obtained in Example 2-11 were also similar to the particles obtained in Example 2-1 as shown in FIG. 11, and no growth ring-like structures were observed in the cross sections of the particles obtained at the completion of neutralization crystallization.

Comparative Example 2-1

In Comparative Example 2-1, nickel composite hydroxide particles were produced in the same manner as in Example 2-1 except that only one raw material liquid supply pipe was provided, and the feed rate of the raw material liquid from one raw material liquid supply pipe was set to 800 mL/min.

The volume fraction of the second highly supersaturated region in the reaction aqueous solution, calculated by simulation in the same manner as in Example 2-1, was 0.624%.

FIG. 12 shows an SEM image of the cross sections of the nickel composite hydroxide particles obtained in Comparative Example 2-1. As can be appreciated from the particles indicated by arrows in FIG. 12, particles with cross sections having growth ring-like structures were observed. Note that the tap density of the obtained nickel composite hydroxide was 1.24 g/cc.

Comparative Example 2-2

In Comparative Example 2-2, nickel composite hydroxide particles were produced in the same manner as in Example 2-1 except that the raw material liquid was prepared so that a nickel composite hydroxide with the formula $Ni_{0.34}Co_{0.33}Mn_{0.33}(OH)_2$ could be obtained, and the feed rate of the raw material liquid from one raw material liquid supply pipe was set to 800 mL/min.

The volume fraction of the second highly supersaturated region in the reaction aqueous solution, calculated by simulation in the same manner as in Example 2-1, was 0.624%.

The nickel composite hydroxide particles obtained in Comparative Example 2-2 was substantially similar to the particles obtained in Comparative Example 2-1 as shown in FIG. 12, and particles with cross sections having growth ring-like structures were observed. Note that the tap density of the obtained nickel composite hydroxide was 1.21 g/cc.

[Summary]

As can be appreciated from Examples 2-1 to 2-11 and Comparative Examples 2-1 and 2-2, as long as the volume fraction of the second highly supersaturated region in the reaction aqueous solution is less than 0.624%, the generation of particles with cross sections having growth ring-like structures can be prevented even if the type of impeller, the diameter of the impeller, and the volume of the agitation tank are changed. Such an effect may be attributed to the gradual growth of particles.

Although a chemical reaction device and a particle production method according to the present invention have been described above with respect to illustrative embodiments, the present invention is not limited to the above-described embodiments and various modifications and improvements may be made within the scope of the present invention.

The present application claims priority to Japanese Patent Application No. 2016-118373 filed on Jun. 14, 2016, the entire contents of which are herein incorporated by reference.

DESCRIPTION OF THE REFERENCE NUMERALS 2 seed crystal particle
4 aggregate
6 outer shell
10 chemical reaction device
12 highly supersaturated region
20 agitation tank
21 bottom portion
22 discharge part
30 impeller
40 shaft
50 baffle
60 raw material liquid supply pipe
61 discharge part

The invention claimed is:

1. A particle production method that is performed with a chemical reaction device including an agitation tank; an impeller; a baffle protruding from an inner peripheral surface of the agitation tank; and a plurality of discharge parts disposed radially inward with respect to the baffle in top view, the particle production method comprising:
   accommodating an aqueous solution in the agitation tank;
   agitating, by the impeller, the solution in the agitation tank where the baffle is provided;
   while discharging a raw material liquid including a nickel salt by the discharge parts into the solution, precipitating particles made of a nickel-containing hydroxide in the solution; and
   in the precipitating the particles, forming a first highly supersaturated region where a molar concentration of the nickel-containing hydroxide dissolved in the aqueous solution is greater than or equal to 5.0 mol/m$^3$ near a discharge part of the plurality of discharge parts, a volume fraction of the first highly supersaturated region in the aqueous solution being less than 0.100%.

2. The particle production method according to claim 1, wherein a distance between the plurality of discharge parts is set up so that a plurality of the first highly supersaturated regions that are formed near the plurality of discharge parts do not overlap with each other.

3. The particle production method according to claim 1, wherein the plurality of discharge parts are set apart from one another on a bottom portion of the agitation tank and are configured to discharge the raw material liquid upward.

4. The particle production method according to claim 3, wherein the plurality of discharge parts are disposed radially outward with respect to the impeller in top view.

5. A particle production method that is performed with a chemical reaction device including an agitation tank; an impeller; a baffle protruding from an inner peripheral surface of the agitation tank; and a plurality of discharge parts disposed radially inward with respect to the baffle in top view, the particle production method comprising:
   accommodating an aqueous solution in the agitation tank;
   agitating, by the impeller, the solution in the agitation tank where the baffle is provided;
   while discharging a raw material liquid including a nickel salt by the discharge parts into the solution, precipitating particles made of a nickel-containing hydroxide in the solution;
   in the precipitating the particles, forming a second highly supersaturated region where a molar concentration of the nickel-containing hydroxide dissolved in the reaction aqueous solution is greater than or equal to 1.7 mol/m$^3$ near a discharge part of the plurality of discharge parts, a volume fraction of the second highly supersaturated region in the aqueous solution being less than 0.624%.

6. The particle production method according to claim 5, wherein a distance between the plurality of discharge parts is set up so that a plurality of the second highly supersaturated regions that are formed near the plurality of discharge parts do not overlap with each other.

* * * * *